(12) United States Patent
Saeki et al.

(10) Patent No.: US 11,366,369 B2
(45) Date of Patent: Jun. 21, 2022

(54) ELECTROCHROMIC ELEMENT

(71) Applicant: CANON KABUSHIKI KAISHA, Tokyo (JP)

(72) Inventors: Kazuho Saeki, Yokohama (JP); Wataru Kubo, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 16/723,916

(22) Filed: Dec. 20, 2019

(65) Prior Publication Data

US 2020/0209699 A1   Jul. 2, 2020

(30) Foreign Application Priority Data

Dec. 27, 2018 (JP) .............................. JP2018-244338
Aug. 6, 2019 (JP) .............................. JP2019-144645

(51) Int. Cl.
*G02F 1/155* (2006.01)
*G02F 1/157* (2006.01)
*G02F 1/161* (2006.01)

(52) U.S. Cl.
CPC .............. *G02F 1/155* (2013.01); *G02F 1/157* (2013.01); *G02F 1/161* (2013.01); *G02F 2001/1552* (2013.01)

(58) Field of Classification Search
CPC .......... G02F 1/155; G02F 1/157; G02F 1/161; G02F 2001/1552; G02F 1/1516
(Continued)

(56) References Cited

U.S. PATENT DOCUMENTS

| | | | |
|---|---|---|---|
| 7,586,664 B2 * | 9/2009 | O'Shaughnessy | G02F 1/155 359/254 |
| 9,581,877 B2 * | 2/2017 | Bass | G02F 1/1503 |

FOREIGN PATENT DOCUMENTS

JP    2012-168554 A    9/2012

OTHER PUBLICATIONS

Sharma et al. "The CIEDE2000 color-difference formula: Implementation notes, supplementary test data, and mathematical observations" Color Research & Application vol. 30, No. 1, pp. 21-30 (2005).

* cited by examiner

*Primary Examiner* — Tuyen Tra
(74) *Attorney, Agent, or Firm* — Canon U.S.A., Inc., IP Division

(57) ABSTRACT

An electrochromic element includes: a first electrode; a second electrode; a peripheral sealing seal arranged between the first electrode and the second electrode; and an electrochromic layer arranged in a space demarcated by the first electrode, the second electrode, and the peripheral sealing seal, one of the first electrode and the second electrode is an anode electrode, and the other is a cathode electrode, the electrochromic layer is an electrochromic element having an anodic electrochromic compound and a cathodic electrochromic compound, the peripheral sealing seal is an anodic reaction-preferential peripheral sealing seal in which an oxidation reaction of the anodic electrochromic compound preferentially occurs near the peripheral sealing seal, and $S_A < S_C$, where $S_A$ is an area demarcated by the peripheral sealing seal of the anode electrode, and $S_C$ is an area demarcated by the peripheral sealing seal of the cathode electrode.

20 Claims, 13 Drawing Sheets

(58) Field of Classification Search
USPC .................................................. 359/265–275
See application file for complete search history.

FIG. 9A
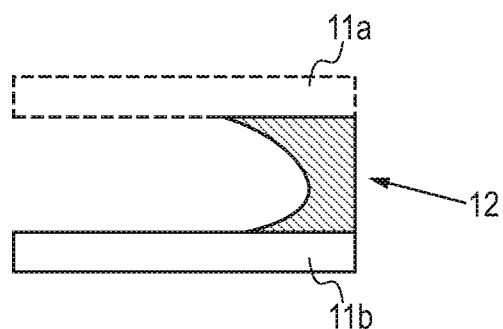
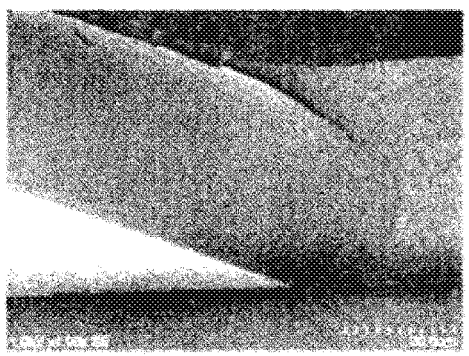
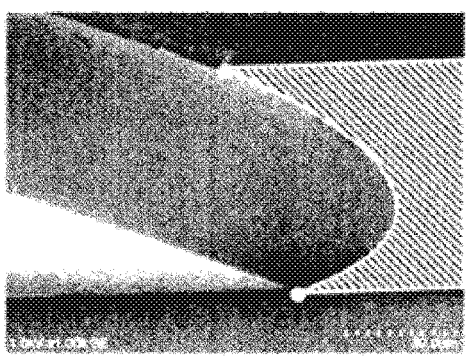
FIG. 9B  FIG. 9C

FIG. 10A
FIG. 10B
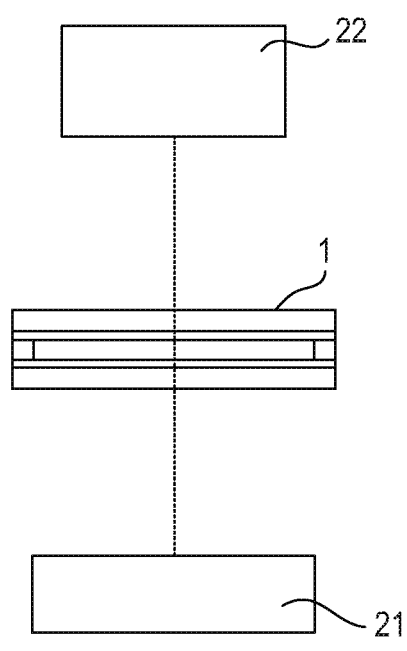
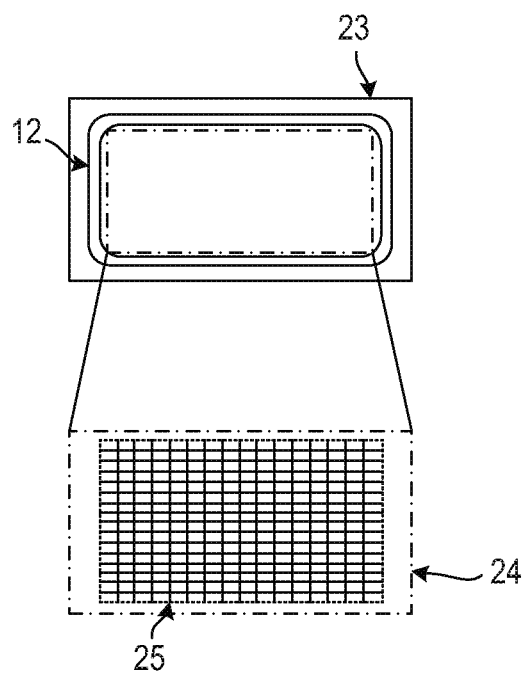

ELECTROCHROMIC ELEMENT

BACKGROUND OF THE INVENTION

Field of the Invention

The present disclosure relates to an electrochromic element and to an optical filter, a lens unit, an imaging device, and a window member using the electrochromic element.

Description of the Related Art

A compound whose optical characteristics of a substance (an absorption wavelength, an absorbance, or the like) change due to an electrochemical oxidation-reduction reaction is referred to as an electrochromic (hereinafter, "electrochromic" may be denoted as "EC") compound. EC elements using an EC compound have been applied to a display device, a variable reflectance mirror, a variable transmission window, or the like. EC compounds are classified into to two, namely, inorganic compounds and organic compounds. The organic EC compounds are featured in that an absorption wavelength can be designed with relatively high flexibility and thus can be changed and that high contrast of coloring and decoloring can be achieved.

In a typical EC element having an organic EC compound, an EC layer containing an EC compound is arranged between a pair of electrodes, and a sealing seal that holds the EC layer is arranged so as to surround the outer circumference of the EC layer. A complementary EC element is known as one type of the typical EC elements having such organic EC compounds. In such a complementary EC element, an anodic EC compound that is colored by oxidation and a cathodic EC compound that is colored by reduction are used as EC compounds. In the complementary EC elements, when a voltage is applied between the pair of electrodes, an oxidation reaction of the anodic EC compound progresses at the anode, colored materials are generated, a reduction reaction of the cathodic EC compound progresses at the same time at the facing cathode, colored materials are generated, and a current flows. Thus, the amount of colored materials of the anodic EC compound and the amount of colored materials of the cathodic EC compound are basically the same in a whole element.

A peripheral sealing seal surrounding the outer circumference of the EC layer is used for reducing leakage of the EC layer to the outside of the element and reducing entry of a substance such as moisture, oxygen, or the like to the EC layer that causes deterioration of the EC compound. In view of the above, as a material forming the peripheral sealing seal, a material that has a low moisture permeability and a low gas permeability and further has a low solubility to a solvent contained in the EC layer is preferable.

Japanese Patent Application Laid-Open No. 2012-168554 discloses a highly durable EC element in which an epoxy novolac resin mixture is used as a material forming a peripheral sealing seal.

Further, one of the objects in EC elements may be the response at coloring and decoloring. As a method for improving the response, a method of improving the concentration of an EC compound is known.

SUMMARY OF THE INVENTION

The inventors have studied an EC element having an increased concentration of an EC compound in order to improve the response speed and found that a difference in the color occurred at coloring between a region near a peripheral sealing seal and the remaining region of the EC layer, and this results in unevenness of color in the element. Such an unevenness of color (hereinafter, which may be referred to as "color unevenness") in an element causes a change in a color tone of light passing through the EC element, which results in a disadvantage.

The present disclosure intends to provide an EC element in which color unevenness due to a peripheral sealing seal is reduced.

An electrochromic element according to one embodiment of the present disclosure includes: a first electrode; a second electrode; a peripheral sealing seal arranged between the first electrode and the second electrode; and an electrochromic layer arranged in a space demarcated by the first electrode, the second electrode, and the peripheral sealing seal, one of the first electrode and the second electrode is an anode electrode, and the other is a cathode electrode, the electrochromic layer is an electrochromic element having an anodic electrochromic compound and a cathodic electrochromic compound, the peripheral sealing seal is an anodic reaction-preferential peripheral sealing seal in which an oxidation reaction of the anodic electrochromic compound preferentially occurs near the peripheral sealing seal, and $S_A < S_C$, where $S_A$ is an area demarcated by the peripheral sealing seal of the anode electrode, and $S_C$ is an area demarcated by the peripheral sealing seal of the cathode electrode.

Further, an electrochromic element according to another embodiment of the present disclosure includes: a first electrode; a second electrode; a peripheral sealing seal arranged between the first electrode and the second electrode; and an electrochromic layer arranged in a space demarcated by the first electrode, the second electrode, and the peripheral sealing seal, one of the first electrode and the second electrode is an anode electrode, and the other is a cathode electrode, the electrochromic layer is an electrochromic element having an anodic electrochromic compound and a cathodic electrochromic compound, the peripheral sealing seal is a cathodic reaction-preferential peripheral sealing seal in which a reduction reaction of the cathodic electrochromic compound preferentially occurs near the peripheral sealing seal, and $S_C < S_A$, where $S_A$ is an area demarcated by the peripheral sealing seal of the anode electrode, and $S_C$ is an area demarcated by the peripheral sealing seal of the cathode electrode.

Further features of the present disclosure will become apparent from the following description of exemplary embodiments with reference to the attached drawings.

BRIEF DESCRIPTION OF THE DRAWINGS

FIG. 9A is a schematic diagram of a peripheral sealing seal nearest-part and a schematic diagram illustrating a positional relationship between an electrode and a peripheral sealing seal at in observation part.

FIG. 9B is an observation image of the peripheral sealing seal nearest-part by a scanning electron microscope.

FIG. 9C is an observation image in which a position of the peripheral sealing seal and the boundary of the peripheral sealing seal in the observation image illustrated in FIG. 9B are specified.

FIG. 10A is a diagram illustrating a color unevenness measuring apparatus and an evaluation method and a diagram illustrating components of an evaluation system and the arrangement thereof.

FIG. 10B is a diagram illustrating a color unevenness measuring apparatus and an evaluation method and a diagram illustrating a relationship between an acquired image obtained by the evaluation system illustrated in FIG. 10A and an analysis region.

DESCRIPTION OF THE EMBODIMENTS

1. Electrochromic Element (EC Element)

Figure 1:
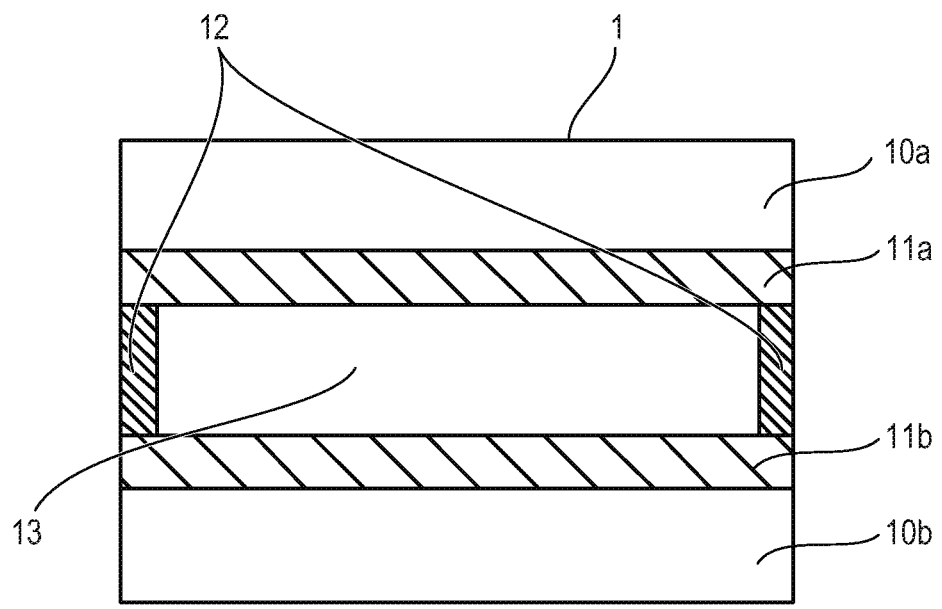
FIG. 1 is a sectional view schematically illustrating one example of EC element according to the present embodiment.

An EC element 1 according to the present embodiment will be described with reference to FIG. 1. FIG. 1 is a sectional view schematically illustrating one example of the EC element according to the present embodiment. The cross section here is a plane orthogonal to the element face (electrode face). The EC element 1 is a device that captures light from the outside, transmits the captured light through an EC layer 13, and thereby changes intensity of emitted light in a predetermined wavelength range.

The EC element of the present embodiment has a first electrode 11a and a second electrode 11b. The first electrode 11a and the second electrode 11b may be arranged on a first substrate 10a and a second substrate 10b, respectively. In the EC element of the present disclosure, a peripheral sealing seal 12 is arranged between the first electrode 11a and the second electrode 11b. An electrochromic layer (EC layer) 13 is arranged in a space demarcated by the first electrode 11a, the second electrode 11b, and the peripheral sealing seal 12. The EC layer 13 has a solvent, an anodic electrochromic compound (anodic EC compound), and a cathodic electrochromic compound (cathodic EC compound). Hereinafter, respective components of the EC element of the present disclosure will be described.

1.1 Electrodes 11a and 11b

In the present disclosure, it is preferable that either one of the first electrode 11a and the second electrode 11b be transparent. Here, "transparent" means that the corresponding electrode transmits light, and it is preferable that the light transmissivity be larger than or equal to 50% and lower than or equal to 100%. This is because, when at least one of the first electrode 11a and the second electrode 11b is a transparent electrode, it is possible to effectively capture light from the outside of the EC element, cause interaction with the EC compounds, and reflect optical characteristics of the EC compounds to emitted light. Further, "light" here is a light in the wavelength range targeted by the EC element. For example, when the EC element is used as a filter of an imaging device for a visible light region, light in the visible light region is targeted, and when the EC element is used as a filter of an imaging device in an infrared ray region, light in the infrared ray region is targeted.

The first electrode 11a and the second electrode 11b may be arranged on the first substrate 10a and the second substrate 10b, respectively. In the present disclosure, it is preferable that either one of the first substrate 10a and the second substrate 10b be transparent. A transparent substrate on which the electrodes 11a and 11b are arranged may be a glass, a transparent resin, or the like. As a glass, an optical glass, a quartz glass, a white plate glass, a blue plate glass, a borosilicate glass, an alkali-free glass, a chemically tempered glass, or the like can be used, and in particular, an alkali-free glass can be used in terms of transparency and durability. A transparent resin may be polyethylene terephthalate, polyethylene naphthalate, polynorbornene, polysulfone, polyether sulfone, polyether ether ketone, polyphenylene sulfide, polycarbonate, polyimide, polymethyl methacrylate, or the like. A non-transparent substrate on which the electrodes 11a and 11b are arranged may be an opaque resin. An opaque resin may be polypropylene, high-density polyethylene, polytetrafluoro ethylene, polyacetal, polybutylene terephthalate, polyamide, or the like.

As a transparent electrode, a transparent conductive oxide, a conductive layer such as distributed carbon nanotubes, or a transparent electrode in which a metal wire is partially arranged on a transparent substrate can be used.

A transparent conductive oxide may be, for example, tin-doped indium oxide (ITO), zinc oxide, gallium-doped zinc oxide (GZO), aluminum-doped zinc oxide (AZO), tin oxide, antimony-doped tin oxide (ATO), fluorine-doped tin oxide (FTO), niobium-doped titanium oxide (TNO), or the like. FTO or ITO is preferable among these oxides. When forming an electrode with a transparent conductive oxide, the film thickness is preferably thicker than or equal to 10 nm and thinner than or equal to 10000 nm. In particular, a transparent conductive oxide layer that has the thickness thicker than or equal to 10 nm and thinner than or equal to 10000 nm and is a layer made of FTO or ITO is preferable. This is because it is thereby possible to achieve both high transparency and chemical stability. Note that a transparent conductive oxide layer may have a configuration in which sublayers of the transparent conductive oxides are stacked. Such a configuration makes it easy to realize high conductivity and high transparency.

A metal wire that may be arranged on the substrate is not particularly limited, and a wire made of an electrochemically stable metal material such as Ag, Au, Pt, or Ti is preferably used. Further, as an arrangement pattern of a metal wire, a grid-shaped pattern is preferably used. An electrode having a metal wire is typically a plane electrode, but a curved electrode may be used if necessary.

As an electrode other than the transparent electrode described above of the first electrode 11a and the second electrode 11b, a preferable electrode is selected in accordance with the application of the EC element. When the EC element is a transmission type EC element, for example, it is preferable that both the first electrode 11a and the second electrode 11b be transparent electrodes described above. Furthermore, when the electrodes are arranged on the substrates, it is preferable that both the first substrate 10a and the second substrate 10b be transparent. In contrast, when the EC element is a reflective EC element, it is preferable that one of the first electrode 11a and the second electrode 11b be a transparent electrode described above and the other be an electrode that reflects an incident light. Furthermore, when the electrodes are arranged on the substrates, it is preferable that at least a substrate on which the transparent electrode is arranged be transparent. On the other hand, by forming a reflective layer or a scattering layer between the electrodes, it is possible to improve flexibility in the optical characteristics of electrodes other than the transparent electrode described above. For example, when a reflective layer or a scattering layer is introduced between the electrodes, an opaque electrode or an electrode that absorbs light can also be used as the downstream electrode thereof.

When the EC element of the present disclosure is any form of element, a material that stably exists in the operating environment of the element and allows the oxidation-reduction reaction to fast progress in response to external application of a voltage is preferably used as a construction material for the first electrode 11a and the second electrode 11b.

Arrangement generally known as electrode arrangement for EC elements can be used for arrangement of the first electrode 11a and the second electrode 11b. A typical example is an arrangement scheme in which the first electrode 11a and the second electrode 11b arranged on a substrate face each other and an inter-electrode distance of around 1 µm or more and 500 µm or less is provided. When the inter-electrode distance is long, it is advantageous in terms of being able to arrange a sufficient amount of an EC compound for achieve an effective function as an EC element and reduce transmissivity at coloring. In contrast, when the inter-electrode distance is short, it is advantageous in terms of being able to achieve a high response speed.

1.2 EC Layer 13

The EC element of the present disclosure has the EC layer 13 containing an anodic EC compound and a cathodic EC compound, preferably further containing a solvent, between the first electrode 11a and the second electrode 11b.

1.2.1 Solvent

As a solvent used for forming the EC layer 13, while the solvent is selected in accordance with an application taking solubility, a vapor pressure, viscosity, a potential window, or the like of a solute such as an EC compound into consideration, a solvent having polarity is preferable. Specifically, an organic polar solvent such as an ether compound, a nitrile compound, an alcohol compound, dimethyl sulfoxide, dimethoxy ethane, sulfolane, dimethyl formamide, dimethyl acetamide, methyl pyrrolidinone, or the like or water may be used. More specifically, a solvent containing a cyclic ether such as propylene carbonate, ethylene carbonate, γ-butyrolactone, valerolactone, dioxolane, or the like is preferably used in terms of solubility, a boiling point, a vapor pressure, viscosity, and a potential window of the EC compound, and among others, a solvent containing propylene carbonate is most preferably used.

1.2.2 EC Compound

In the present disclosure, an EC compound is a type of oxidation-reduction substance and a substance whose light absorption characteristic changes in the light wavelength range targeted by the element due to the oxidation-reduction reaction. Further, the oxidation-reduction substance described above is a compound that can repeatedly cause an oxidation-reduction reaction within a predetermined potential range. The light absorption characteristic described here representatively corresponds to a light absorption state and a light transmission state, and the EC compound is typically a material that switches itself between the light absorption state and the light transmission state. It is preferable that the EC compound used for the EC element of the present disclosure be an organic compound. A low molecular weight organic compound having a molecular weight of 2000 or less is preferable for the organic EC compound of the present disclosure.

In the present specification, an EC compound may be described as "an anodic EC compound" or "a cathodic EC compound", each of which will be described in detail below.

1.2.2.1 Anodic EC Compound

An anodic EC compound refers to a material whose light absorption characteristic changes typically due to an oxidation reaction in which electrons are removed from the EC compound on the anode in the light wavelength range targeted by the element. A typical example may be a material that transitions from the light transmission state to the light absorption state. In the present specification, for easier visual understanding of transition of the EC compounds, transition from the light transmission state to the light absorption state, which is a typical example, may be considered and described. Further, in the present specification, a molecule in the light transmission state may be represented as "a decolored material", and a molecule in the light absorption state may be represented as "a colored material". In such a case, in the light wavelength range targeted by the element, a reduced form of an anodic EC compound is in the light transmission state and represented as "a decolored material". Further, an oxidized form of an anodic EC compound is in the light absorption state and represented as "a colored material".

An example of the anodic EC compound may be a thiophene derivative, amines having an aromatic ring (for example, a phenazine derivative, a triallylamine derivative), a pyrrole derivative, a thiazine derivative, a triallylmethane derivative, a bisphenylmethane derivative, a xanthene derivative, a fluoran derivative, or a spiropyran derivative, for example. Out of these compounds, amines having a low molecular weight aromatic ring are preferable, and a dihydrophenazine derivative is most preferable as an anodic EC molecule.

1.2.2.2 Cathodic EC Compound

An example of the cathodic EC compound is a material whose light absorption characteristic changes typically due to a reduction reaction in which electrons are supplied from the electrode to the EC compound on the cathode in the light wavelength range targeted by the element. A typical example may be a material that transitions from the light transmission state to the light absorption state. In the description of the present specification, in the light wavelength range targeted by the element, a reduced form of a cathodic EC compound is in the light absorption state and represented as "a colored material". Further, an oxidized form of a cathodic EC compound is in the light transmission state and represented as "a decolored material".

An example of the cathodic EC compound may be a pyridine based compound such as viologen, a quinone compound, or the like. Among others, a pyridine based compound such as viologen is most preferably used.

1.2.3 Method for Forming the EC Layer

A method used for introducing a solution containing an EC compound in an EC element may be forming an opening in a part of the electrode 11a or 11b, or the peripheral sealing seal 12 when the electrodes 11a and 11b facing each other are joined and then injecting a solution through the opening, for example. Further, a specific method used for injecting a solution containing an EC compound into a cell may be a vacuum injection method, an atmospheric injection method, a meniscus method, or the like. After the injection of the solution containing the EC compound in the cell described above, the solution can be stably held in the cell by sealing the opening.

1.3 Peripheral Sealing Seal 12

It is preferable that the first electrode 11a and the second electrode 11b be arranged to face each other and joined by the peripheral sealing seal 12. The peripheral sealing seal 12 is responsible for reducing leakage of the EC layer 13 to the outside of the EC element or protecting the EC layer 13 from contacting with an external substance, in addition to holding spatial arrangement of the first electrode 11a and the second electrode 11b.

In view of the above consideration, it is preferable that a material forming the peripheral sealing seal 12 be formed of a material that is chemically stable, has low moisture transmission and low gas transmission, and further has low solubility in the solvent contained in the EC layer 13. For example, an inorganic material such as glass frit, an organic material such as an epoxy based or acryl based resin or the like, metals, or the like may be used. Note that the peripheral sealing seal may have a function of defining the distance between the first electrode 11a and the second electrode 11b by containing a spacer material or the like. When the peripheral sealing seal 12 has no function of defining the distance between the first electrode 11a and the second electrode 11b, a spacer may be separately provided to maintain the distance between the two electrodes. As the material of the spacer, an inorganic material such as silica beads, a glass fiber, or the like or an organic material such as polyimide, polytetrafluoroethylene, polydivinylbenzene, fluororubber, an epoxy resin, or the like may be used. In such a case, the spacer can define and maintain the distance between the first electrode 11a and the second electrode 11b forming the EC element.

The inventors have found that either one of the anodic EC compound and the cathodic EC compound may be preferentially colored with respect to the other near the peripheral sealing seal 12 in the EC layer 13. Here, "preferentially colored" means that, when the EC element is driven and reaches a stable state where the optical density of the element transitions near the target density, there are more colored materials of either one of the anodic EC compound and the cathodic EC compound than the colored materials of the other. For example, "the anodic EC compound is preferentially colored near the peripheral sealing seal 12" means that, when the optical density of the EC element has become stable after the element is driven, there are more colored materials of the anodic EC compound than the colored materials of the cathodic EC compound near the peripheral sealing seal 12. Specifically, this indicates that the color of the colored material of the anodic EC compound is exhibited more significantly than the color of the colored material of the cathodic EC compound. When preferential coloring of the anodic EC compound or the cathodic EC compound is present near the peripheral sealing seal 12 as described above, a color difference between the region near the peripheral sealing seal 12 in the EC layer 13 and other regions occurs when the EC element is driven, and thereby color unevenness will be caused within the element face.

Figure 2:
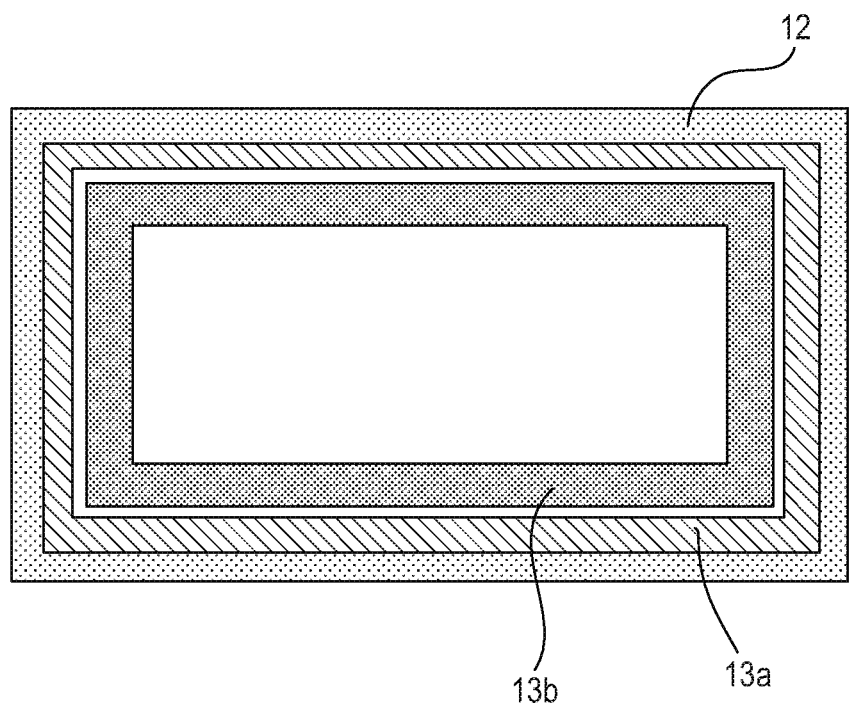
FIG. 2 is a diagram illustrating a typical distribution of color unevenness within an element face due to a peripheral sealing seal.

FIG. 2 illustrates a typical distribution of a preferential coloring region found near the peripheral sealing seal 12. FIG. 2 here is a view of the EC element viewed from a direction perpendicular to the element face. As illustrated in FIG. 2, the preferential coloring region occurs in two regions of "a peripheral sealing seal nearest-part 13a" and "a peripheral sealing seal semi-near-part 13b". Here, "the peripheral sealing seal nearest-part 13a" refers to a region of the EC layer 13 near the boundary at which the peripheral sealing seal 12 and the EC layer 13 contact with each other, and "the peripheral sealing seal semi-near-part 13b" refers to an outer edge of a region of the EC layer 13 that does not include the peripheral sealing seal nearest-part 13a. The region of the "peripheral sealing seal nearest-part 13a" has a width of around 200 μm from the boundary on the side where the peripheral sealing seal 12 is adjacent to the EC layer 13, and this width hardly depends on the distance between the upper and lower electrodes. Further, in accordance with the form of appearance of the preferential coloring in "the peripheral sealing seal nearest-part 13a", the peripheral sealing seals 12 are classified into three types of an anodic reaction-preferential peripheral sealing seal, a cathodic reaction-preferential peripheral sealing seal, and the other peripheral sealing seal that is not classified into these two types. The two types, which are the anodic reaction-preferential peripheral sealing seal and the cathodic reaction-preferential peripheral sealing seal, will be described below.

1.3.1 Anodic Reaction-Preferential Peripheral Sealing Seal

The anodic reaction-preferential peripheral sealing seal is defined as a peripheral sealing seal 12 that represents preferential coloring of the anodic EC compound in the peripheral sealing seal nearest-part 13a. Further, in the anodic reaction-preferential peripheral sealing seal, preferential coloring of the cathodic EC compound occurs in the peripheral sealing seal semi-near-part 13b.

Features of a sealing material representing a character as the anodic reaction-preferential peripheral sealing seal may be that the sealing material is formed of a resin having a relatively large polarity, that the sealing material contains an oxidizing compound, or the like.

The reason for the former described above will be described below. While a decolored material of a viologen based compound that is a representative cathodic EC compound has positive charges, a decolored material of an anodic EC compound has no charge as represented by an aromatic amine based compound such as triphenylamines, phenazines, or the like or a thiophene based compound. Therefore, the decolored material of the cathodic EC compound has a larger polarity than the decolored material of the anodic EC compound. As described below, a thin film made of a material forming the peripheral sealing seal is present on the electrode surface in the peripheral sealing seal nearest-part 13a and the peripheral sealing seal semi-near-part 13b. In the region of the peripheral sealing seal nearest-part 13a of these regions, the film thickness of the thin film is relatively larger than that of the peripheral sealing semi-near-part 13b. Therefore, in the region of the peripheral sealing seal nearest-part 13a, when the peripheral sealing seal is made of a resin having a large polarity, interaction of the decolored material of the cathodic EC compound having a high polarity with the resin having a large polarity is greater than that of the decolored material of the anodic EC compound having a low polarity. As a result, the transfer of the decolored material of the cathodic EC compound to the electrode surface is significantly prevented compared to the decolored material of the anodic EC compound. As a result, the anodic EC compound is preferentially colored in the peripheral sealing seal nearest-part 13a. A peripheral sealing seal having an epoxy resin or the like may satisfy the features described above, for example.

Further, the reason for the latter will be described below. When an oxidizing compound is contained in the peripheral sealing seal, proton addition to the anodic EC compound near the peripheral sealing seal or oxidation that removes electrons from an anodic EC compound may occur. When oxidized anodic EC compound has an absorption range in the visible range, absorption derived from oxidative coloring species of the anodic EC compound strongly appears near the peripheral sealing seal. A peripheral sealing seal containing a curing agent or a curing accelerating agent such as a heat/photocurable epoxy based resin or a photocurable acryl based resin, specifically, a peripheral sealing seal containing a Lewis acid or the like that is by-produced from an onium salt such as an acid anhydride, a phenol based resin, an antimony based compound, or the like may satisfy the features described above, for example. A more specific example of a curing agent or a curing accelerating agent that may be included in the anodic reaction-preferential peripheral sealing seal may be a potential thermal acid generating agent that combines an onium salt such as a sulfonium salt, a benzothiazolium salt, an ammonium salt, an phosphonium salt, or the like with an antimonate based compound or a phosphate based compound, a potential photoacid generating agent such as a halogen-containing triazine based compound, a diazoketone based compound, an onium salt based compound, or a sulfonic acid based compound, a phenolic resin based curing agent such as a novolak resin, a cresol resin, or the like, an acid anhydride such as phthalic anhydrides, maleic anhydrides, pyromellitic anhydrides, or the like, a curing accelerating agent such as p-toluenesulfonic acid salt and phenol salt of 1,8-diazabicyclo (5,4,0)-undecene-7 (DBU), p-toluenesulfonic acid salt and phenol salt of 1,5-diazabicyclo (4,3,0)-nonene-5 (DBN), or the like.

Note that classification of the type of peripheral sealing seal is determined in accordance with a method for determination of peripheral sealing seal types described below regardless of whether or not the component described above is contained.

1.3.2 Cathodic Reaction-Preferential Peripheral Sealing Seal

The cathodic reaction-preferential peripheral sealing seal is defined as a peripheral sealing seal 12 that represents preferential coloring of the cathodic EC compound in the peripheral sealing seal nearest-part 13a. Further, in the cathodic reaction-preferential peripheral sealing seal, preferential coloring of the anodic EC compound occurs in the peripheral sealing seal semi-near-part 13b.

Features of a sealing material representing a character as the cathodic reaction-preferential peripheral sealing seal may be that the sealing material is formed of a material having a relatively small polarity, that the sealing material contains a reducing compound, or the like.

The reason for the former described above will be described below. As described above, a thin film having a relatively thick thickness is present on the electrode surface in the peripheral sealing seal nearest-part 13a. Therefore, when the peripheral sealing seal is formed of a material having a small polarity, in the peripheral sealing seal nearest-part 13a, interaction of the decolored material of the anodic EC compound having a small polarity with the peripheral sealing seal having a small polarity is greater than that of the decolored material of the cathodic EC compound having a high polarity. As a result, the transfer of the decolored material of the cathodic EC compound to the electrode surface is significantly prevented compared to the decolored material of the anodic EC compound. As a result, the cathodic EC compound is preferentially colored in the peripheral sealing seal nearest-part 13a. A peripheral sealing seal having a synthetic rubber or the like may satisfy the features described above, for example.

Further, the reason for the latter will be described below. When a reducing compound is contained in the peripheral sealing seal, a reducing compound present on the outermost surface of the film or an eluted reducing compound may cause the reduction reaction of the cathodic EC compound present near the peripheral sealing seal. Thereby, coloring of the cathodic EC compound will significantly appear in the peripheral sealing seal nearest-part 13a. A peripheral sealing seal containing a curing agent and a curing accelerating agent such as a low molecular weight amine based compound, polyamidoamine, an imidazole based compound, a triarylphosphine based compound, or the like may satisfy the features described above, for example. More specific example of a curing agent or a curing accelerating agent that may be included in the cathodic reaction-preferential peripheral sealing seal may be a potential photoamine generating agent such as carbamates, carbamoyloximes, aromatic sulfonamides, α-lactones, a benzhydrylammonium salt, an imidazole salt, an amidine salt, or the like, a potential thermal amine generating agent such as piperidine carboxylates, a low molecular weight amine such as an aliphatic polyamine based compound such as a triethylenetetramine or aromatic polyamine based compound such as diaminodiphenylmethane, a sensitizer such as alkylaminobenzophenone, a curing accelerating agent such as 1,8-diazabicyclo (5,4,0)-undecene-7 (DBU), 1,5-diazabicyclo (4,3,0)-nonene-5 (DBN), or the like.

Note that classification of the type of peripheral sealing seal is determined in accordance with a method for determination of peripheral sealing seal types described below regardless of whether or not the component described above is contained.

1.3.2 Method for Determinating Type of Peripheral Sealing Seal

Figure 3:
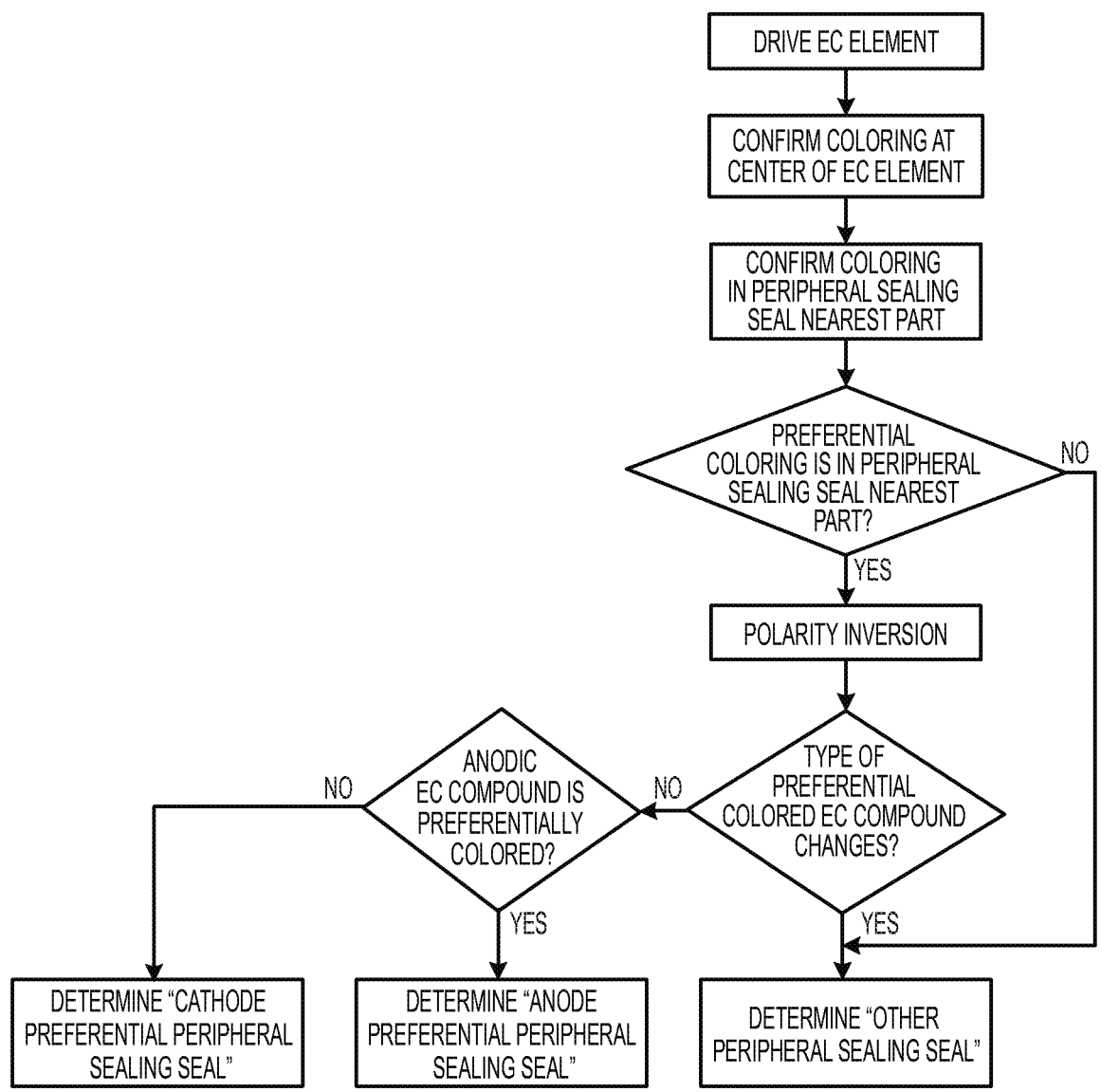
FIG. 3 is a diagram illustrating a flowchart used for determining the type of peripheral sealing seal.

The peripheral sealing seals are classified into an anodic reaction-preferential peripheral sealing seal, a cathodic reaction-preferential peripheral sealing seal, and the other peripheral sealing seal that is not classified into these two types described above. The method for performing the above classification will be described with reference to the flowchart of FIG. 3.

Figure 4:
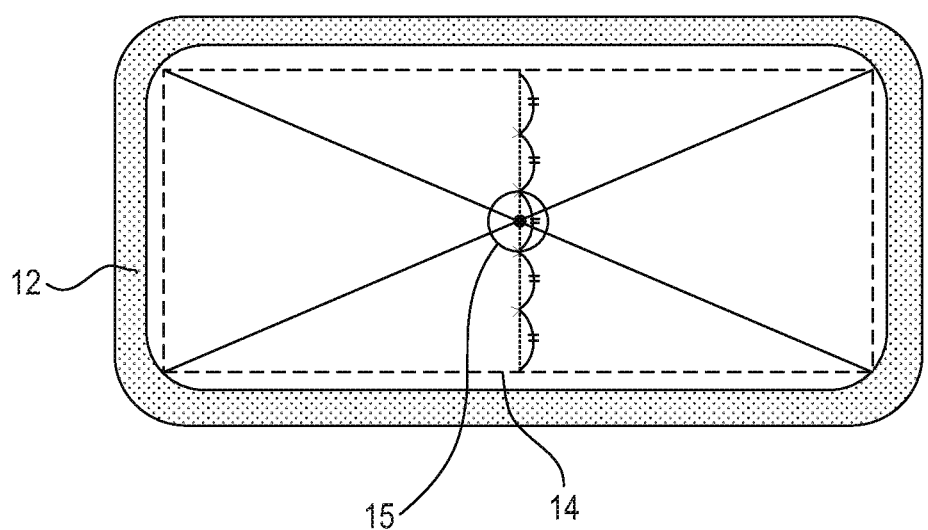
FIG. 4 is a diagram illustrating a method used for defining an element central part.

First, a voltage is applied to the EC element to be colored, and coloring of the EC element central part and coloring of the peripheral sealing seal nearest-part 13a are checked. Next, the coloring of the EC element central part and the coloring of the peripheral sealing seal nearest-part 13a are compared. A method for defining the EC element central part will be described with reference to FIG. 4. First, a region inside the peripheral sealing seal 12 is defined by a rectangular region 14 having the maximum area. A circle region 15 having the center that is the centroid of the rectangular region defined as described above, and the diameter that is ⅕ times the length of the short side of the rectangular region is defined as the EC element central part.

Further, when coloring of the region of the peripheral sealing seal nearest-part 13a is checked, coloring of a region inside the EC layer that is within the distance of 1 mm from the boundary between the peripheral sealing seal and the EC layer will be checked, and when coloring of one EC compound significantly appears in a part of the region or the entire region compared to the EC element central part, it is determined that "preferential coloring is present".

Figure 5:
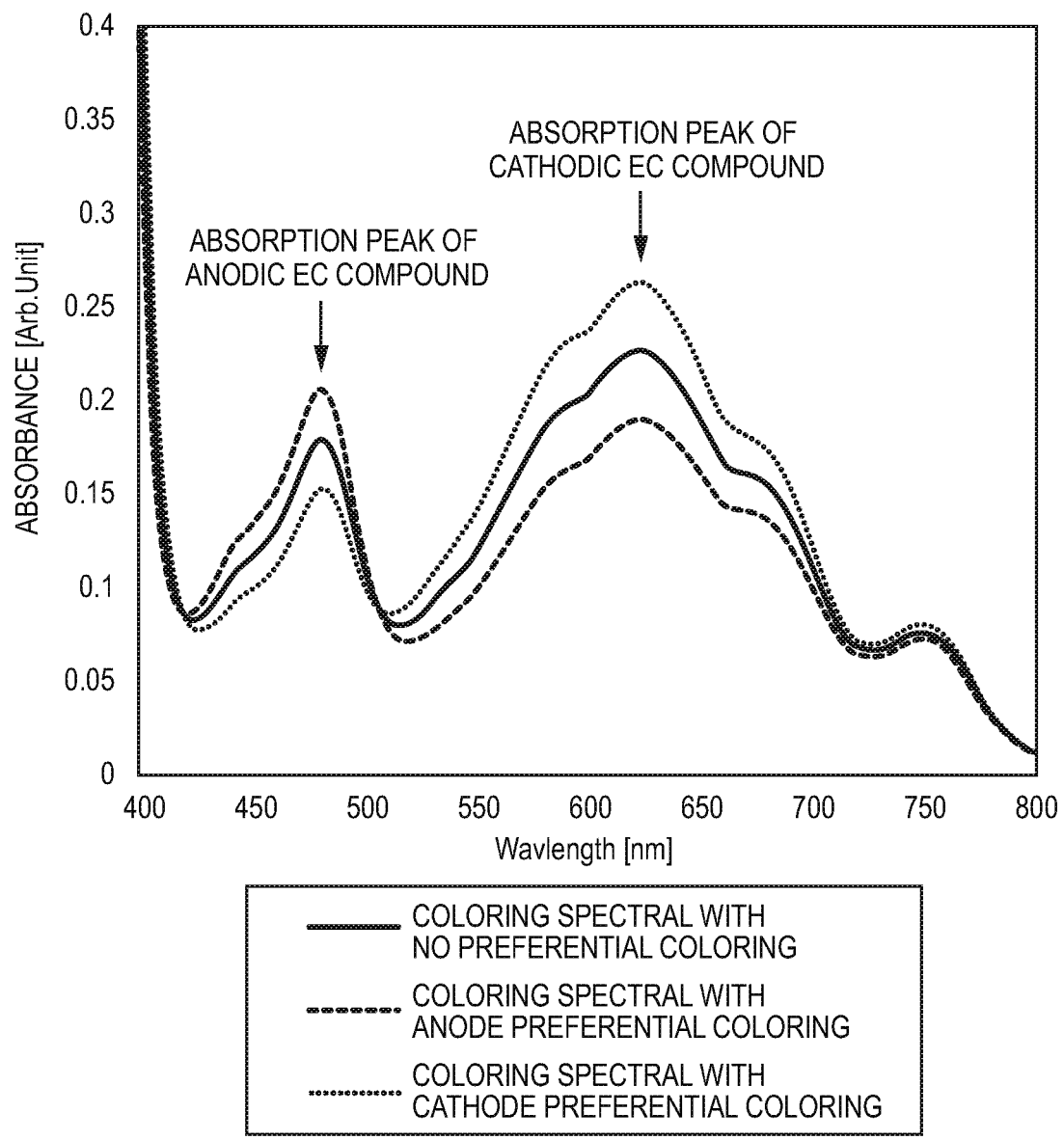
FIG. 5 is a diagram illustrating a spectral shape difference between a coloring spectrum when preferential coloring occurs and a coloring spectrum without preferential coloring.

Based on the condition that defines the central part described above, coloring of the EC element central part is the coloring in a region away from a part near the peripheral sealing seal in the EC layer and reflects the coloring of the EC element without color unevenness, that is, preferential coloring. Therefore, when coloring of the anodic EC compound or the cathodic EC compound significantly appears in the peripheral sealing seal nearest-part compared to the EC element central part, it is determined that there is preferential coloring in the peripheral sealing seal nearest-part. Color can be compared by visual observation, image analysis or the like using a camera or the like. Further, coloring spectra in the EC element central part and the peripheral sealing seal nearest-part 13a may be acquired and compared. FIG. 5 illustrate examples of a coloring spectrum without preferential coloring, a coloring spectrum when the anodic EC compound is preferentially colored, and a coloring spectrum when the cathodic EC compound is preferentially colored. As described, when there is preferential coloring, compared to a case where there is no preferential coloring, absorption corresponding to the anodic EC compound and the cathodic EC compound that are preferentially colored is increased and absorption corresponding to the other EC compound is reduced. Therefore, color changes compared to a case where there is no preferential coloring. It is therefore possible to determine the presence or absence of preferential coloring and the type of EC compound that is preferentially colored by using visual observation, comparison using an image, or spectral shape changes. As a result of checking coloring of the EC element central part and the peripheral sealing seal nearest-part 13a in such a way, when there is no preferential coloring, the peripheral sealing seal is determined as "the other peripheral sealing seal". When preferential coloring is confirmed, the peripheral sealing seal type will be further determined by the process described below.

The polarity of the voltage applied to the EC element is inverted, and coloring of the peripheral sealing seal nearest-part is checked again. When the type of EC compound (anodic EC compound/cathodic EC compound) that is preferentially colored changes at this time, the peripheral sealing seal is determined as "the other peripheral sealing seal".

When the type of EC compound that is preferentially colored does not change by the polarity inversion, determination will be performed as described below. If the EC compound preferentially colored in the peripheral sealing seal nearest 13a is the anodic EC compound, the peripheral sealing seal is determined as "anodic reaction-preferential peripheral sealing seal". Further, if the EC compound preferentially colored in the peripheral sealing seal nearest 13a is the cathodic EC compound, the peripheral sealing seal is determined as "cathodic reaction-preferential peripheral sealing seal".

The reason for performing determination by the polarity inversion will be described below. Even in the case of "the other peripheral sealing seal", which is neither "anodic reaction-preferential peripheral sealing seal" nor "cathodic reaction-preferential peripheral sealing seal", preferential coloring may occur near the peripheral sealing seal. A representative example of this case may be a case where an obstacle that prevents the EC compound from transferring to the electrode surface is present in either one of the electrodes. In such a case, in the electrode on the side where no obstacle is present when the EC element is driven, coloring of the EC compound corresponding to the polarity of the electrode preferentially occurs (such a phenomenon may be referred to as electrode obstacle color unevenness). Specifically, in a region in which such an obstacle is present in the cathode and no obstacle is present in the anode, the anodic EC compound is preferentially colored. Further, in a region in which such an obstacle is present in the anode and no obstacle is present in the cathode, the cathodic EC compound is preferentially colored. Here, a region in which one electrode is covered with a thin film made of a material forming the peripheral sealing seal and the other electrode is not covered may occur near the peripheral sealing seal 12. The electrode obstacle color unevenness significantly appears in such a region.

In color unevenness due to electrode obstruction, in response to inversion of the polarity of the voltage externally applied when the EC element is driven, the EC compound that is preferentially colored changes to the other EC compound. Specifically, in response to inversion of the polarity of the voltage, the preferential coloring of the anodic EC compound transitions to the preferential coloring of the cathodic EC compound, and the preferential coloring of the cathodic EC compound transitions to the preferential coloring of the anodic EC compound. On the other hand, in color unevenness due to the anodic reaction-preferential peripheral sealing seal or the cathodic reaction-preferential peripheral sealing seal, since the type of the EC compound that is preferentially colored does not change in response to the inversion of the voltage polarity, which can be distinguished from color unevenness occurring near these non-preferential peripheral sealing seal.

1.3.3 Relationship Between Concentration of EC Compound and Color Unevenness Due to Peripheral Sealing Seal 12

Figure 6:
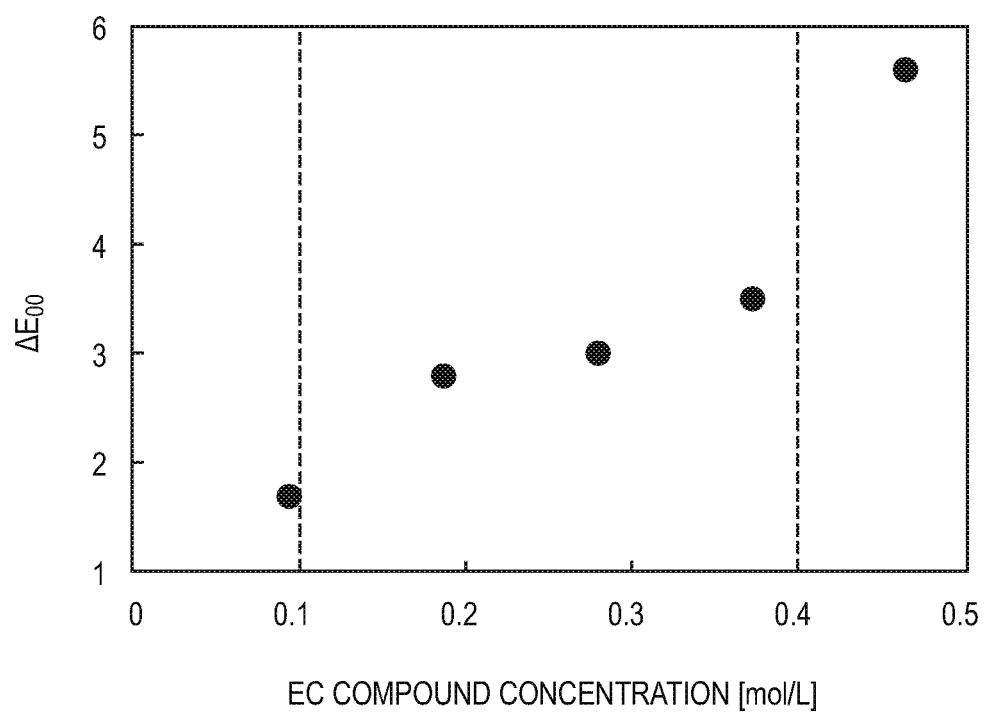
FIG. 6 is a diagram illustrating a relationship between a concentration of an EC compound and a degree of color unevenness due to the peripheral sealing seal.

FIG. 6 illustrates a relationship between the concentration of the EC compound and the degree of color unevenness due to the peripheral sealing seal 12. The concentration of the EC compound on the horizontal axis of FIG. 6 means the sum of the concentrations of the anodic EC compound and the cathodic EC compound contained in the EC layer 13. Note that, for acquisition of data illustrated in FIG. 6, an element in which the peripheral sealing seal 12 is the anodic reaction-preferential peripheral sealing seal and the area of the anode electrode demarcated by the peripheral sealing seal 12 ($S_A$) is larger than the area of the cathode electrode demarcated by the peripheral sealing seal 12 ($S_C$) is used. The concentration of the anodic EC compound and the concentration of the cathodic EC compound are the same in the element. Further, the degree of color unevenness ($\Delta E_{00}$) on the vertical axis of FIG. 6 will be described later. It can be seen from the result that the degree of color unevenness due to the peripheral sealing seal 12 increases in the concentration range in which the concentration of the EC compound is higher than or equal to 0.1 mol/L and the degree of color unevenness further increases in the concentration range in which the concentration of the EC compound is higher than or equal to 0.4 mol/L. An aspect of the present disclosure is to reduce the degree of color unevenness due to the peripheral sealing seal 12, and the advantage of the present disclosure will be significantly obtained in the concentration range that is higher than or equal to 0.1 mol/L, in particular, higher than or equal to 0.4 mol/L.

2. Onset Mechanism of Color Unevenness Due to Peripheral Sealing Seal 12

As described previously, when preferential coloring of the anodic EC compound is observed in the peripheral sealing seal nearest-part 13a (the peripheral sealing seal 12 is an anodic reaction-preferential peripheral sealing seal), preferential coloring of the cathodic EC compound occurs in the peripheral sealing seal semi-near-part 13b at the same time. Further, when preferential coloring of the cathodic EC compound is observed in the peripheral sealing seal nearest-part 13a (the peripheral sealing seal 12 is a cathodic reaction-preferential peripheral sealing seal), preferential coloring of the anodic EC compound occurs in the peripheral sealing seal semi-near-part 13b at the same time.

The inventors observed and analyzed the surfaces of the electrodes 11a and 11b near the peripheral sealing seal 12 in order to determine a cause of occurrence of such a coloring distribution when the EC element is driven. As a result, it was found that thin films formed by a component forming the peripheral sealing seal 12 were formed on the surfaces of the electrodes 11a and 11b near the peripheral sealing seal 12. Furthermore, electrochemical measurement was performed on the anodic reaction-preferential peripheral sealing seal. Specifically, electrodes on which thin films having various thicknesses were formed were made, coloring reaction properties of the anodic EC compound and the cathodic EC compound on the thin film surface were examined from the current at the time of coloring reaction, and the following was found.

(1) On an electrode having the thin film, coloring reaction speeds of the cathodic EC compound and the anodic EC compound decrease compared to an electrode having no thin film, and the degree of the reduction increases as the film thickness increases. (2) On an electrode having a thin film whose film thickness is the smallest, the coloring reaction speed of the anodic EC compound decreases, the relationship of the coloring reaction speeds satisfies: cathodic EC compound>anodic EC compound. (3) On an electrode having a thin film whose film thickness is larger than the above, while every coloring reaction speed decreases significantly, the relationship of the coloring reaction speeds satisfies: anodic EC compound>cathodic EC compound.

The above three features are experimental facts related to an anodic preferential peripheral sealing seal. Further, in a cathodic preferential peripheral sealing seal, while the same applies with respect to (1), the relationship of the coloring reaction speeds is opposite to that for the anodic preferential peripheral sealing seal with respect to (2) and (3). That is, when the film thickness of a thin film is small, the relationship of the coloring reaction speeds satisfies: anodic EC compound>cathodic EC compound. When the film thickness of a thin film is large, the relationship of the coloring reaction speeds satisfies: cathodic EC compound>anodic EC compound.

Figure 7:
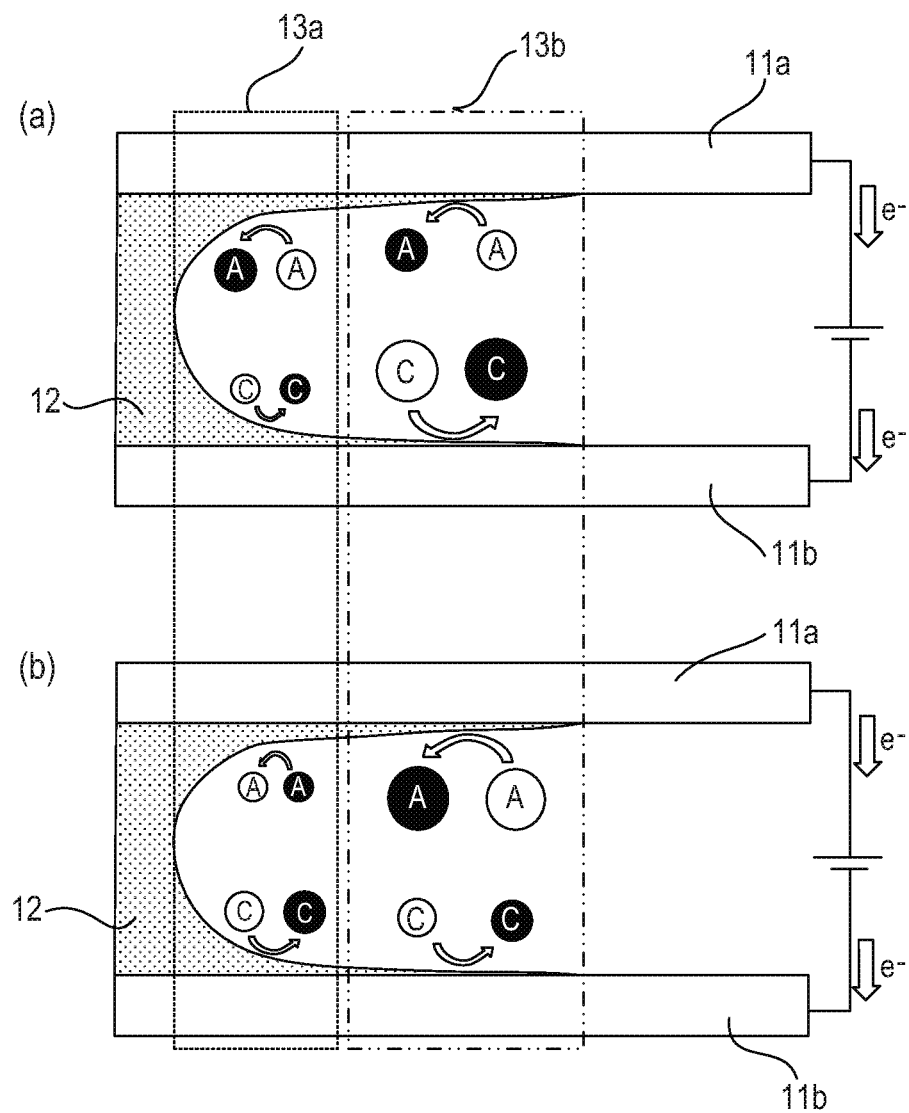
FIG. 7 is a diagram schematically illustrating an onset mechanism of color unevenness due to the peripheral sealing seal.

FIG. 7 is a diagram schematically illustrating an onset mechanism of color unevenness concluded from the above experimental facts. FIG. 7 illustrates a part near the peripheral sealing seal 12 of the sectional view of the EC element. Here, the cross section corresponds to a plane orthogonal to the element face. (a) of FIG. 7 illustrates the onset mechanism of color unevenness when the peripheral sealing seal 12 is an anodic reaction-preferential peripheral sealing seal, and (b) of FIG. 7 illustrates the onset mechanism of color unevenness when the peripheral sealing seal 12 is a cathodic reaction-preferential peripheral sealing seal. In FIG. 7, the first electrode 11a is the anode electrode, and the second electrode 11b is the cathode electrode. Further, a white circle including a black letter "A" (A in a white circle) represents a decolored material of an anodic EC compound, and a black circle including a white letter "A" (A in a black circle) represents a colored material of an anodic EC compound. Further, a white circle including a black letter "C" (C in a white circle) represents a decolored material of a cathodic EC compound, and a black circle including a white letter "C" (C in a black circle) represents a colored material of a cathodic EC compound.

As illustrated in (a) of FIG. 7, when the peripheral sealing seal 12 is the anodic preferential peripheral sealing seal, more colored materials of the cathodic EC compound occur than colored materials of the anodic EC compound in the peripheral sealing seal semi-near-part 13b in which the film thickness of the thin film (the peripheral sealing seal 12) on the electrode is relatively small. Since both the anode electrode and the cathode electrode form an electrically closed circuit when the EC element is driven, the amount of colored materials of both compounds are basically the same in the whole element. Therefore, imbalance of colored materials occurring in the peripheral sealing seal semi-near-part 13b is required to be compensated. This is compensated when the amount of colored materials of the anodic EC compound is greater than the amount of colored materials of the cathodic EC compound in the peripheral sealing seal nearest-part 13a.

Further, as illustrated in (b) of FIG. 7, when the peripheral sealing seal 12 is the cathodic preferential peripheral sealing seal, more colored materials of the anodic EC compound occur than colored materials of the cathodic EC compound in the peripheral sealing seal semi-near-part 13b in which the film thickness of the thin film on the electrode is relatively small, as illustrated in (b) of FIG. 7. As described previously, since both the electrodes form an electrically closed circuit when the EC element is driven, imbalance of colored materials occurring in the peripheral sealing seal semi-near-part 13b is required to be compensated. This is compensated when the amount of colored materials of the cathodic EC compound is greater than the amount of colored materials of the anodic EC compound in the peripheral sealing seal nearest-part 13a.

3. Method of Defining Electrode Area Demarcated by Peripheral Sealing Seal 12

As described later, in the present disclosure, color unevenness is improved by controlling the size relationship of the areas demarcated by the peripheral sealing seal 12 of the anode electrode and the cathode electrode. There are two methods of defining the electrode area demarcated by the peripheral sealing seal 12. Respective methods will be described below in detail.

3.1 Method of Directly Observing Boundary of Peripheral Sealing Seal 12

Figure 8:
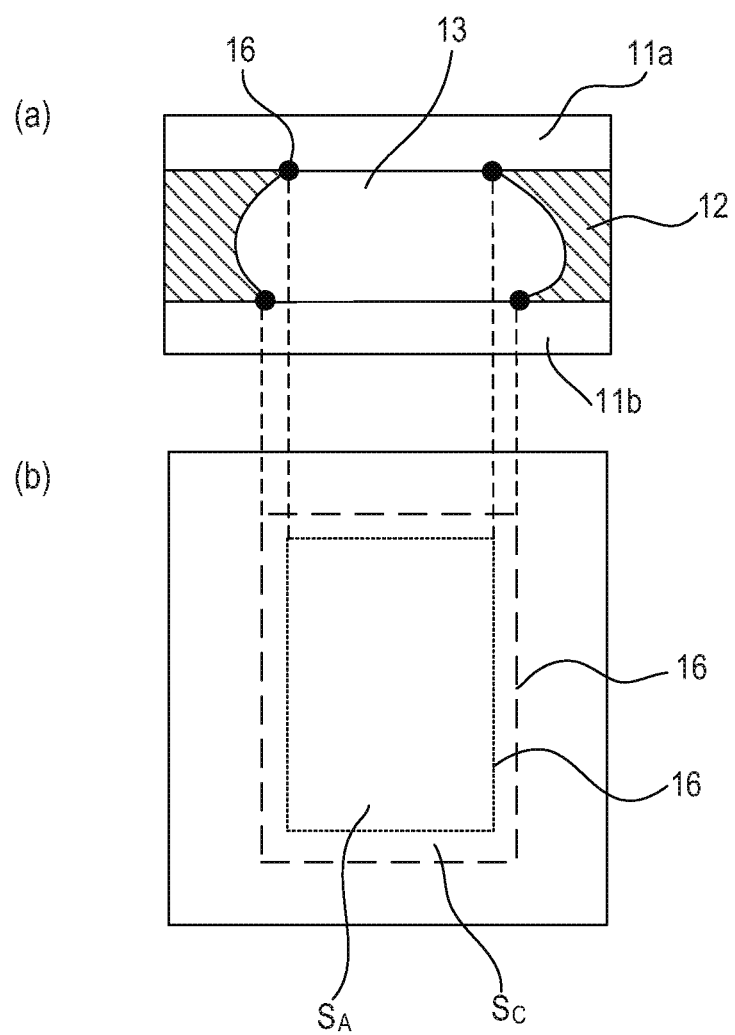
FIG. 8 is a diagram schematically illustrating an area demarcated by the peripheral sealing seal.

FIG. 8 illustrates a conceptual diagram of the electrode area demarcated by the peripheral sealing seal 12. (a) of FIG. 8 is a sectional view of an EC element when cut in a direction perpendicular to the electrode face. (b) of FIG. 8 is a top view of the EC element when observed from the direction perpendicular to the electrode face. In FIG. 8, the first electrode 11a is the anode electrode, and the second electrode 11b is the cathode electrode. As illustrated in FIG. 8, the area demarcated by the peripheral sealing seal 12 is the area of a region surrounded by a boundary 16 between a region covered with the peripheral sealing seal 12 and a region not covered with the peripheral sealing seal 12 (hereinafter, which may be referred to as "peripheral sealing seal boundary") on the electrode face. Here, the region covered with the peripheral sealing seal 12 is defined as a region where the peripheral sealing seal 12 is present on the electrode surface with a thickness of 100 (nm) or greater. This is because no coloring reaction occurs with the anodic EC compound and the cathodic EC compound on an electrode covered with the peripheral sealing seal 12 with the film thickness around 100 (nm) on the surface. The position of the peripheral sealing seal boundary 16 is determined by directly observing the electrode surface using a scanning electron microscope, for example.

FIG. 9A, FIG. 9B, and FIG. 9C illustrate diagrams when the EC element fabricated based on the examples described later is cut in the direction perpendicular to the electrode face and the electrode surface near the peripheral sealing seal 12 is observed. FIG. 9A is a schematic diagram illustrating a positional relationship of the electrode and the peripheral sealing seal 12 at the observed part. In FIG. 9A, the first electrode 11a is the anode electrode, and the second electrode 11b is the cathode electrode. FIG. 9B is an observed image with a scanning electron microscope. FIG. 9C explicitly illustrates the position of the peripheral sealing seal 12 and the peripheral sealing seal boundary 16 when overlapped with the same image as FIG. 9B. Note that, in FIG. 9B and FIG. 9C, the first electrode 11a (anode electrode) illustrated in FIG. 9A is removed for observation. Further, the hatched region in FIG. 9C illustrates a cut section of the peripheral sealing seal 12. Further, a white circle at the end of the cut section of the peripheral sealing seal 12 is the boundary between the peripheral sealing seal 12 and the electrode surface and corresponds to the peripheral sealing seal boundary 16 in FIG. 8. In such a way, by directly observing the position of the peripheral sealing seal boundary 16, it is possible to determine the area $S_A$ demarcated by the peripheral sealing seal 12 of the anode electrode 11a and the area $S_C$ demarcated by the peripheral sealing seal 12 of the cathode electrode 11b.

Further, when a hole such as an opening is provided in a region on the electrode face surrounded by the peripheral sealing seal boundary 16 and no electrode is present in a portion of the opening, it is preferable to directly observe the boundary of the peripheral sealing seal 12 as a method of defining the areas $S_A$ and $S_C$ demarcated by the peripheral sealing seal 12. In such a case, the following definition is provided. When the sum of the areas of openings provided in the upper and lower substrates is less than or equal to 1/10 of the area of the smaller of $S_A$ and $S_C$, the regions of the openings are also included in the areas of the electrodes. In the region of an opening, no electrode is present on the side where the opening is provided, and an electrode is present only on the facing side. Thus, in this region, a coloring reaction occurs only on the side where the electrode is present when the EC element is driven. That is, when an opening is provided in the anode electrode 11a, only the coloring of the cathodic EC compound occurs. When an opening is provided in the cathode electrode 11b, only the coloring of the anodic EC compound occurs. Here, since both the anode electrode and the cathode electrode form an electrically closed circuit when the EC element is driven, the amounts of colored materials of both compounds are basically the same in the entire element. Therefore, to compensate imbalance of colored materials generated at the opening, a region in which the other colored materials are preferentially colored occurs around the opening. Here, when the inventors conducted a series of experiments, it was confirmed that, when the area of the opening is less than or equal to 1/10 of the area of the smaller of $S_A$ and $S_C$, the color unevenness occurring due to the opening less affects the color unevenness occurring near the peripheral sealing seal. Therefore, in the present specification in which a color unevenness due to the peripheral sealing seal 12 is targeted, with respect to an opening satisfying the above requirement, the region thereof is included as the area of the electrode, and the size relationship between the areas of the electrodes is compared.

3.2 Method of Electrochemical Definition

A method of defining the size of the electrode area by using the fact that, in an electrochemical reaction causing a coloring reaction of an EC compound, a current amount and a charge amount are proportional to the electrode area will be described. First, an EC solution containing an anodic EC compound, a cathodic EC compound, and a solvent is prepared. This EC solution is conditioned so that a reaction of one of the anodic EC compound and the cathodic EC compound is far more likely to occur than a reaction of the other EC compound. As an example, when the concentration of the anodic EC compound is 10 times the concentration of the cathodic EC compound, this results in a condition where a reaction of the anodic EC compound is far more likely to occur than a reaction of the cathodic EC compound. When this EC solution is used as the EC layer 13, the restriction factor of a current flowing in the element is the reaction of the EC compound having a polarity with which a reaction is far less likely to occur. (In the case of the above example, a reaction of the cathodic EC compound having 1/10 concentration is the restriction factor.) Thus, an electrode reaction of a polarity with which a reaction resulting in such a restriction factor occurs restricts the current of the element. Here, when the EC element is colored by maintaining the voltage value applied between the first electrode 11a and the second electrode 11b at constant and inverting the polarity, since the current amount is proportional to the electrode area, the current flowing in the element is proportional to the area of the electrode on the side in which a reaction resulting in the restriction factor occurs. In the case of the above example, respective currents are compared for a case where the first electrode 11a is the cathode and a case where the second electrode 11b is the cathode, and the area of one electrode through which a larger current flows will be larger than the area of the other electrode. In such a way, it is possible to define the size relationship between the area $S_A$ demarcated by the peripheral sealing seal of the anode electrode and the area $S_C$ demarcated by the peripheral sealing seal of the cathode electrode.

4. Control of Electrode Area Demarcated by Peripheral Sealing Seal 12

Control of the size relationship between $S_A$ and $S_C$ can be performed by applying the peripheral sealing seal 12 to one of the electrodes and then changing a thermal condition applied to the electrode at manufacturing of an EC element, for example. The thermal condition may be a temperature of the electrode and time for maintaining the electrode at the temperature, for example. The optimal thermal condition for realizing the suitable size relationship between $S_A$ and $S_C$ illustrated in the present specification varies in accordance with the composition or a curing condition of the peripheral sealing seal. For example, in the peripheral sealing seal containing a large amount of solvent at application thereof, since a lower temperature applied after the peripheral sealing seal is applied results in a longer time to volatilize the solvent, the peripheral sealing seal more spreads over the applied substrate compared to a case of higher temperature. Thus, a lower temperature applied after the peripheral sealing seal is applied results in a smaller area demarcated by the peripheral sealing seal on the applied electrode side than that in a case of a higher temperature.

5. Solution of Color Unevenness due to Peripheral Sealing Seal

As described previously, the amount of colored materials of the anodic EC compound and the amount of colored materials of the cathodic EC compound are the same in the whole element at coloring. In color unevenness due to the peripheral sealing seal 12, the imbalance of colored materials occurring in the peripheral sealing seal semi-near-part 13b is compensated by the peripheral sealing seal nearest-part 13a, and thus the conditions described above are satisfied. Accordingly, the inventors have proposed to prevent the compensation of imbalance of colored materials in the peripheral sealing seal nearest-part 13a to reduce imbalance of colored materials in the peripheral sealing seal semi-near-part 13b and reduce color unevenness. The solution will be specifically described below for a case where the peripheral sealing seal 12 is an anodic reaction-preferential peripheral sealing seal and a case where the peripheral sealing seal 12 is a cathodic reaction-preferential peripheral sealing seal, respectively.

5.1 when Peripheral Sealing Seal 12 is Anodic Reaction-Preferential Peripheral Sealing Seal When the peripheral sealing seal 12 is an anodic reaction-preferential peripheral sealing seal, $S_A<S_C$ is satisfied for the area $S_A$ demarcated by the peripheral sealing seal 12 of the anode electrode 11a and the area $S_C$ demarcated by the peripheral sealing seal 12 of the cathode electrode 11b. Preferably, $S_A<S_C$ and $S_C<2S_A$. More preferably, $S_A<S_C<2S_A$ and $S_C-S_A \geq 200$ (µm)×$L_C$. Here, $L_C$ is the length (µm) of the peripheral sealing seal boundary 16 on the cathode electrode 11b. The reasons for the above will be described below.

5.1.1 $S_A<S_C$

In accordance with this condition, a region covered with the peripheral sealing seal 12 on the anode electrode 11a in the peripheral sealing seal nearest-part 13a is larger than a region covered by the peripheral sealing seal 12 on the facing cathode electrode 11b. As a result, compared to the case of $S_A \geq S_C$, a coloring reaction of the anodic EC compound is more prevented in the peripheral sealing seal nearest-part 13a. Accordingly, preferential coloring of the cathodic EC compound in the peripheral sealing seal semi-near-part 13b is reduced, and color unevenness is reduced. Thus, the feature of $S_A<S_C$ is effective for reducing color unevenness compared to the case of $S_C=S_A$ even when the difference thereof is small.

5.1.2 $S_C<2S_A$

When $S_A<S_C$, the area of a region which is covered with the peripheral sealing seal 12 on the anode electrode 11a but is not covered with the peripheral sealing seal 12 on the facing cathode electrode 11b (hereinafter, which may be referred to as "region 1") is equal to $S_C-S_A$ that is the difference between $S_C$ and $S_A$. In the region 1, when the EC element is driven, a coloring reaction occurs only on the cathode electrode 11b, and as a result, only the colored materials of the cathodic EC compound will occur. Here, since both the anode and cathode electrodes form an electrically closed circuit when the EC element is driven, the amounts of colored materials of the anodic compound and the cathodic compound are basically the same in the entire element. Therefore, to compensate the imbalance of colored materials occurring in the region, an anode-preferentially colored region (hereinafter, which may be referred to as "region 2") will occur in which colored materials of the anodic EC compound occurs preferentially outside the region 1. When the inventors conducted a series of experiments, it was confirmed that the two regions (the regions 1 and the region 2) in a compensating relationship of the imbalance have substantially the same area. Now, the area of the region which is not covered with the peripheral sealing seal on both the electrodes (hereinafter, which may be referred to as "region 3") is equal to $S_A$, which is the smaller area of $S_C$ and $S_A$. Therefore, when $S_C-S_A<S_A$, the anode-preferential colored region (the region 2) has a smaller area than the region which is not covered with the peripheral sealing seal on both the electrodes (the region 3), which is preferable in terms of a color reproducibility of an image passing through the EC element. The condition described above is obtained from the above discussion.

5.1.3 $S_C-S_A \geq 200$ (µm)×$L_C$

From a series of experiments conducted by the inventors, it was confirmed that the region of the peripheral sealing seal nearest-part 13a is located with a width of around 200 (µm) from the peripheral sealing seal boundary 16 to the inside of the EC layer 13 on the electrode having the larger area demarcated by the peripheral sealing seal 12 (the cathode electrode 11b). Therefore, when the length of the peripheral sealing seal boundary 16 on the cathode electrode is $L_C$ (µm), the area of the peripheral sealing seal nearest-part 13a is at most 200 (µm)×$L_C$. Therefore, when $S_C-S_A \geq 200$ (µm)×$L_C$, since it is possible to prevent the entire preferential coloring of an anodic EC compound occurring in the peripheral sealing seal nearest-part 13a, this is preferable for the purpose of reducing color unevenness.

5.2 when Peripheral Sealing Seal 12 is Cathodic Reaction-Preferential Peripheral Sealing Seal When the peripheral sealing seal 12 is a cathodic reaction-preferential peripheral sealing seal, $S_C<S_A$ is satisfied for the area $S_C$ demarcated by the peripheral sealing seal 12 of the cathode electrode 11b and the area $S_A$ demarcated by the peripheral sealing seal 12 of the anode electrode 11a. Preferably, $S_C<S_A$ and $S_A<2S_C$. More preferably, $S_C<S_A<2S_C$ and $S_A-S_C \geq 200$ (µm)×$L_A$. Here, $L_A$ is the length (µm) of the peripheral sealing seal boundary 16 on the anode electrode 11a. The reasons for the above will be described below.

5.2.1 $S_C<S_A$

In accordance with this condition, a region covered with the peripheral sealing seal 12 on the cathode electrode 11b in the peripheral sealing seal nearest-part 13a is larger than a region covered by the peripheral sealing seal 12 on the facing anode electrode 11a. As a result, compared to the case of $S_C \geq S_A$, a coloring reaction of the cathodic EC compound is more prevented in the peripheral sealing seal nearest-part 13a. Accordingly, preferential coloring of the anodic EC compound in the peripheral sealing seal semi-near-part 13b is reduced, and color unevenness is reduced. Thus, the feature of $S_C<S_A$ is effective for reducing color unevenness compared to the case of $S_C=S_A$ even when the difference thereof is small.

5.2.2 $S_A<2S_C$

When $S_C<S_A$, the area of a region which is covered with the peripheral sealing seal 12 on the cathode electrode 11b but is not covered with the peripheral sealing seal 12 on the facing anode electrode 11a (hereinafter, which may be referred to as "region 4") is equal to $S_A-S_C$ that is the difference between $S_A$ and $S_C$. In the region 4, when the EC element is driven, a coloring reaction occurs only on the anode electrode 11a, and as a result, only the colored materials of the anodic EC compound will occur. Here, since both the anode and cathode electrodes form an electrically closed circuit when the EC element is driven, the amounts of colored materials of the anodic compound and the cathodic compound are basically the same in the entire element. Therefore, to compensate the imbalance of colored materials occurring in the region, a cathode-preferentially colored region (hereinafter, which may be referred to as "region 5") will occur in which colored materials of the cathodic EC compound occur preferentially outside the region 4. When the inventors conducted a series of experiments, it was confirmed that the two regions (the regions 4 and the region 5) in a compensating relationship of the imbalance have substantially the same area. Now, the area of the region which is not covered with the peripheral sealing seal on both the electrodes (hereinafter, which may be referred to as "region 6") is equal to $S_C$, which is the smaller area of $S_C$ and $S_A$. Therefore, when $S_A-S_C<S_C$, the cathode-preferential colored region (the region 5) has a smaller area than the region which is not covered with the peripheral sealing seal on both the electrodes (the region 6), which is preferable in terms of a color reproducibility of an image passing through the EC element. The condition described above is obtained from the above discussion.

5.2.3 $S_A-S_C \geq 200$ (μm)×$L_A$

As described previously, the region of the peripheral sealing seal nearest-part 13a is located with a width of 200 (μm) from the peripheral sealing seal boundary 16 to the inside of the EC layer 13 on the electrode having the larger area demarcated by the peripheral sealing seal 12 (the anode electrode 11a). Therefore, when the length of the peripheral sealing seal boundary 16 on the anode electrode is $L_A$ (μm), the area of the peripheral sealing seal nearest-part 13a is at most 200 (μm)×$L_A$. Therefore, when $S_A-S_C \geq 200$ (μm)×$L_A$, since it is possible to prevent the entire preferential coloring of an anodic EC compound occurring in the peripheral sealing seal nearest-part 13a, this is preferable for the purpose of reducing color unevenness.

Note that, when the areas of both the electrodes demarcated by the peripheral sealing seal 12 are differentiated as seen in the present disclosure, the degree of color unevenness varies in accordance with the polarity of an externally applied voltage when the EC element is driven. This is because the anode and the cathode of the electrodes are interchanged by inversion of the polarities and thereby the size relationship between the anode electrode and the cathode electrode is reversed after the inversion. Specifically, when the peripheral sealing seal 12 is an anodic reaction-preferential peripheral sealing seal and $S_A<S_C$, the degree of color unevenness deteriorates due to the inversion of polarities. This is because the inversion of polarities results in $S_C<S_A$, and the size relationship of the areas after the inversion is opposite to the size relationship of the areas of the present disclosure. Further, when the peripheral sealing seal is a cathodic reaction-preferential peripheral sealing seal and $S_C<S_A$, the degree of color unevenness deteriorates due to the inversion of polarities. This is because the inversion of polarities results in $S_A<S_C$, and also in this case, the size relationship of the areas after the inversion is opposite to the size relationship of the areas of the present disclosure.

6. Evaluation Method of Color Unevenness

The evaluation method of color unevenness, which is color ununiformity within an element, will be described with reference to FIG. 10A and FIG. 10B. FIG. 10A illustrates components of an evaluation system and the arrangement thereof. FIG. 10B is a diagram schematically illustrating the relationship between an acquired image obtained thereby and an analysis region.

A flat lighting device 21 and an imaging device 22 are arranged with respect to the transmission type EC element 1 such that the optical axis is perpendicular to the element face. Images are acquired sequentially for 24 hours immediately after the EC element 1 starts being driven. Within an image, a region surrounded by the peripheral sealing seal 12 is approximated as a rectangular region 24 that occupies the largest area. With respect to the rectangular region 24, a rectangular region determined by four conditions described below is defined as an analysis region 25 on which analysis described later is performed.

(i) the longer side is 0.8 folds
(ii) the shorter side is 0.74 folds
(iii) the centroid matches
(iv) the longer side is parallel to the longer side of the original rectangle R values, B values, and G values of all the pixels included in the analysis region 25 were averaged, respectively, to acquire the reference RGB values. Furthermore, the analysis region 25 was divided into 256 rectangular regions of 16 in vertical and 16 in horizontal, and the color difference $\Delta E_{00}$ between the average RGB values of each region and the reference RGB values were calculated by using a color difference equation based on the definition of CIEDE2000. Note that, with respect to the color difference equation of CIEDE2000, reference was made to Sharma, Gaurav; Wu, Wencheng; Dalal, Edul N. "The CIEDE2000 color-difference formula: Implementation notes, supplementary test data, and mathematical observations" Color Research & Applications 30(1), 21-30 (2005). The maximum value of the color difference $\Delta E_{00}$ of each point obtained in such a way was determined as the absolute value of color unevenness at each time.

Application of the EC element 1 according to the present embodiment may be a display device, a variable reflectance mirror, a variable transmittance window, an optical filter, or the like. When color unevenness occurs in the above application, the balance of the color of a transmission light or a reflection light will be unintendedly changed at each point of the EC element face, which is undesirable for each application.

With respect to the color difference $\Delta E_{00}$, a case where the EC element is used as an optical filter of a camera, in particular, an ND filter will be considered as an example. When color unevenness occurs in an EC element used as an ND filter, a tinge will vary at each point of a captured image. Specifically, when the peripheral sealing seal 12 used in the EC element is an anodic reaction-preferential peripheral sealing seal, coloring of the cathodic EC compound (typically, green to blue) significantly appears in a region of the peripheral sealing seal semi-near-part 13b. On the other hand, when the peripheral sealing seal 12 used in the EC element is a cathodic reaction-preferential peripheral sealing seal, coloring of the anodic EC compound (typically, red) significantly appears in a region of the peripheral sealing seal semi-near-part 13b. Accordingly, when the degree of color unevenness due to the peripheral sealing seal 12 is large, the quality of an acquired image significantly decreases, which is not preferable.

As discussed above, when an EC element is used for application of an optical filter or the like, a reduced degree of color unevenness is demanded. Specifically, it is preferable that the color difference $\Delta E_{00}$ be less than or equal to 3.2. This is because, when the color difference between two colors is less than or equal to 3.2, the two colors are determined as the same color in visual inspection by a human in general. That is, also when an EC element is used as an optical filter, it is important that the maximum value of $\Delta E_{00}$ in a plane satisfy the condition of being less than or equal to 3.2 in order to maintain the quality of an acquired image. This can reduce a situation where an object is viewed to be more tinged with green or red in the peripheral part of a screen than in the center part, for example.

7. Advantage of the Present Disclosure

In the present disclosure, the EC layer 13 containing an anodic EC compound and a cathodic EC compound is arranged in a space demarcated by the facing two electrodes 11a and 11b and the peripheral sealing seal 12, and a complementary EC element in which the EC compounds cause an oxidation-reduction reaction at the electrodes is targeted. In such an EC element, one of the anodic EC compound and the cathodic EC compound may be colored preferentially near the peripheral sealing seal 12 at driving, and color unevenness may occur within the element face. While an increase in the EC compound concentration is demanded in terms of response and optical concentration, the degree of such color unevenness due to the peripheral sealing seal 12 increases as the EC compound concentration in the EC layer 13 (the sum of concentrations of the anodic EC compound and the cathodic EC compound) increases. In the present disclosure, by controlling the size relationship between $S_A$ and $S_C$, it is possible to reduce color unevenness due to the peripheral sealing seal 12 even when the EC compound concentration is increased.

8. Optical Filter, Lens Unit, and Imaging Device

The EC element 1 can be used for an optical filter. An optical filter according to another embodiment of the present disclosure has the EC element 1 and an active element connected to the EC element 1. The active element is an element that adjusts a light amount passing through the EC element and may be, specifically, a switching element used for controlling transmittance of the EC element. The switching element may be a TFT or a MIM element, for example. The TFT is also referred to as a thin film transistor, and a semiconductor or an oxide semiconductor is used as the composition material thereof. Specifically, a semiconductor whose composition material is an amorphous silicon, a low-temperature polysilicon, or InGaZnO, or the like may be used.

The EC element 1 can be used for an imaging device and a lens unit. An imaging device according to another embodiment of the present disclosure has an optical filter described above having an EC element and a light receiving element 110 that receives a light that has passed through the optical filter.

Further, a lens unit according to another embodiment of the present disclosure has an optical filter described above having an EC element and an imaging optical system. The imaging optical system is preferably a lens group having a plurality of lenses. The optical filter may be arranged so that a light that has passed through the optical filter passes through the imaging optical system or may be arranged so that a light that has passed through the imaging optical system passes through the optical filter. Further, the optical filter may be arranged between lenses of multiple lenses. It is preferable for the optical filter to be provided on the optical axis of the lens. An amount of a light that is to pass through the imaging optical system or a light that has passed through the imaging optical system can be adjusted by the optical filter.

Figure 11A:
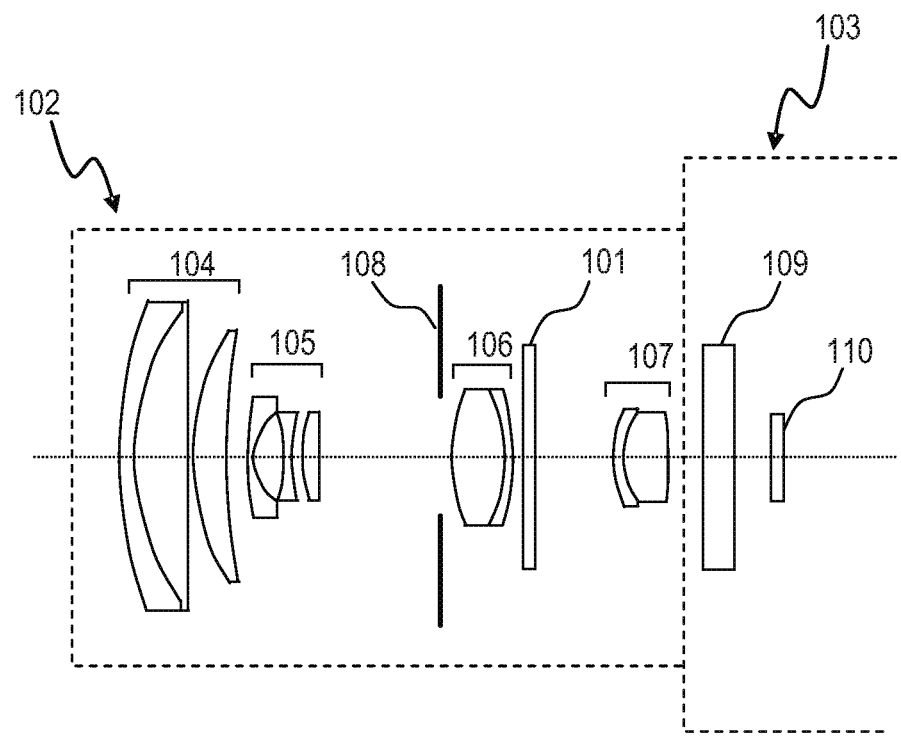
FIG. 11A is a schematic diagram illustrating an imaging device having a lens unit using an optical filter as one example of an imaging device and a lens unit.
Figure 11B:
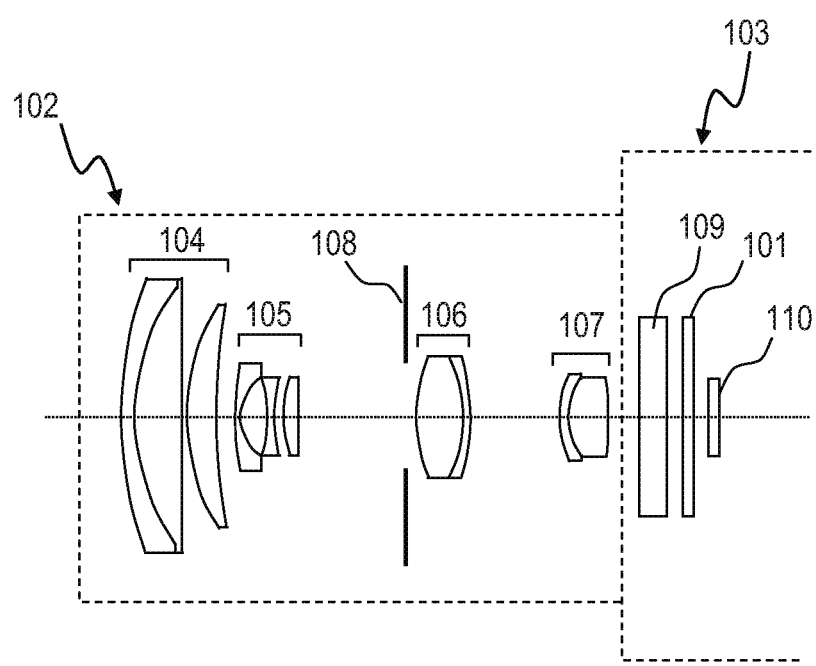
FIG. 11B is a schematic diagram illustrating an imaging device having an optical filter as another example of an imaging device and a lens unit.

FIG. 11A and FIG. 11B are diagrams schematically illustrating one example of an imaging device and a lens unit using the optical filter. FIG. 11A illustrates an imaging device having a lens unit 102 using the optical filter 101, and FIG. 11B illustrates an imaging device having the optical filter 101. As illustrated in FIG. 11A, the lens unit 102 is connected in a removable manner to an imaging unit 103 via a mount member (not illustrated).

The lens unit 102 is a unit having a plurality of lenses or lens groups. For example, in FIG. 11A, the lens unit 102 represents a zoom lens of a rear focus scheme that performs focusing on the post-stage of an aperture. The lens unit 102 has four lens groups: a first lens group 104 of positive refractive power, a second lens group 105 of negative refractive power, a third lens group 106 of positive refractive power, and a fourth lens group 107 of positive refractive power in this order from the subject side (the left side to the sheet). The magnification is changed by changing the interval between the second lens group 105 and the third lens group 106, and focusing is performed by moving some of the lens of the fourth lens group 107. For example, the lens unit 102 has an aperture 108 between the second lens group 105 and the third lens group 106 and has the optical filter 101 between the third lens group 106 and the fourth lens group 107. The arrangement is such that a light passing through the lens unit 102 passes through each of the lens groups 104 to 107, the aperture 108, and the optical filter 101, and a light amount can be adjusted by using the aperture 108 and the optical filter 101.

Further, the arrangement inside the lens unit 102 can be changed as appropriate. For example, the optical filter 101 can be arranged in front of the aperture 108 (on the subject side) or behind the aperture 108 (on the imaging unit 103 side), and may be arranged in front of the first lens group 104 or may be arranged on behind the fourth lens group 107. With the optical filter 101 being arranged at a position where a light converges, there is an advantage of the reduced area of the optical filter 101 or the like. Further, the form of the lens unit 102 can be selected as appropriate, which may be an inner focus scheme that performs focusing in front of the aperture or other schemes instead of the rear focus scheme. Further, a special lens such as a fisheye lens, a macro-lens, or the like instead of the zoom lens can be selected as appropriate.

The imaging unit 103 has a glass block 109 and the light receiving element 110. The glass block 109 is a glass block such as a low-pass filter, a phase plate, a color filter, or the like. Further, the light receiving element 110 is a sensor unit that receives a light that has passed through the lens unit 102, and an image pickup device such as CCD or CMOS can be used. Further, the light receiving unit 110 may be an optical sensor such as a photodiode, and an element that acquires and outputs information on the intensity or the wavelength of a light can be used as appropriate.

As illustrated in FIG. 11A, when the optical filter 101 is embedded in the lens unit 102, a drive unit such as an active element may be arranged inside the lens unit 102 or may be arranged outside the lens unit 102. When the drive unit is arranged outside the lens unit 102, the EC element and the drive unit inside and outside the lens unit 102 are connected via a wiring for drive control.

As illustrated in FIG. 11B, the imaging device may have the optical filter 101. The optical filter 101 may be arranged at a suitable part inside the imaging unit 103, and the light receiving element 110 may be arranged so as to receive a light that has passed through the optical filter 101. In FIG. 11B, the optical filter 101 is arranged closely in front of the light receiving element 110, for example. When the optical filter 101 is built in the imaging device, since the connected lens unit 102 is not required to have the optical filter 101, it is possible to configure a dimmable imaging device using an existing lens unit.

Such an imaging device is applicable to a product having a combination of a light amount adjustment function and a light receiving element. For example, the imaging device can be used in a camera, a digital camera, a video camera, or a digital video camera and can be applied to a product such as a mobile phone or a smartphone, a PC, a tablet, or the like in which the imaging device is built in.

By using the optical filter according to the present embodiment as a dimming member, it is possible to appropriately change a dimming amount by a single filter, and there is an advantage of the reduced number of components or space-saving.

According to the optical filter, the lens unit, and the imaging device of the present embodiment, color unevenness due to the peripheral sealing seal in the EC element can be reduced. Thus, quality deterioration of an image obtained by capturing a light that has transmitted through or has been reflected by the optical filter can be reduced.

9. Window Member

Figure 12A:
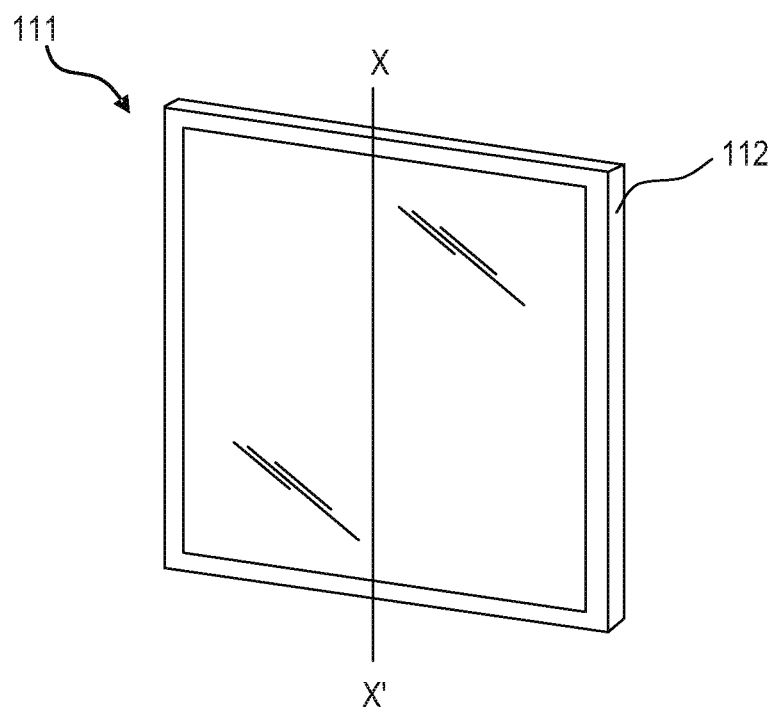
FIG. 12A is a perspective view schematically illustrating one example of a window member.
Figure 12B:
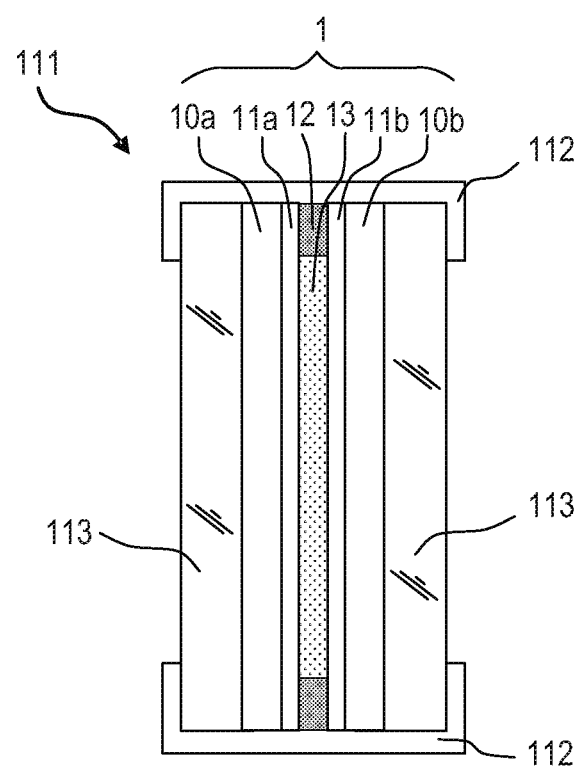
FIG. 12B is a sectional view taken along a plane X-X' of the window member illustrated in FIG. 12A.

The window member according to another embodiment of the present disclosure has the EC element 1 and an active element connected to the EC element. FIG. 12A and FIG. 12B are diagrams schematically illustrating one example of the window member according to the present embodiment. FIG. 12A is a perspective view, and FIG. 12B is a sectional view taken along X-X' of FIG. 12A.

A window member 111 illustrated in FIG. 12A and FIG. 12B is a dimming window and is formed of the EC element 1, a transparent plate 113 (a pair of substrates) interposing the EC element, and a frame 112 surrounding and integrating the entirety. The active element is an element that adjusts a light amount passing through the EC element 1 and may be directly connected to the EC element 1 or may be indirectly connected to the EC element 1. Further, the active element may be integrated inside the frame 112 or may be arranged outside the frame 112 and connected to the EC element 1 through a wiring.

The transparent plate 113 is not particularly limited as long as it is a material having a high light transmittance and, when a use as a window is considered, is preferably a glass material. While the EC element 1 is a separate member from the transparent plate 113 in FIG. 12B, the substrate 10 of the EC element 1 may be considered as the transparent plate 113, for example.

Any material may be used for the frame 112, and a general member that covers at least a part of the EC element 1 and has an integrated form can be considered as a frame.

Such a dimming window may be referred to as a window member having an electronic curtain, a sufficient transmission light amount is obtained for incident light when the EC element 1 is in a decolored state, and optical characteristics to reliably shield and modulate incident light can be obtained in a colored state. The window member according to the present embodiment can be applied to application to adjust the incidence amount of the sunlight in daytime into a room, for example. Such a window member can be also applied to adjustment of a heat amount of the sun as well as a light amount and thus can be used for control of the brightness or the temperature inside a room. Further, such a window member is applicable to application to block a view from the outside of a room to the inside of the room as a shutter. Such a dimming window is applicable not only to a glass window for a building but also to a window of a vehicle such as an automobile, a train, an airplane, a ship, or the like or a filter on the display surface of a watch or a mobile phone.

EXAMPLES

While the present disclosure will be more specifically described below with examples, the present invention is not limited thereto.

10. Fabrication of EC Element

The EC element having the structure illustrated in FIG. 1 was fabricated by the following method. Two transparent conductive glass substrates (10a, 10b) on which an indium doped tin oxide (ITO) film (electrodes 11a, 11b) was deposited were prepared. In one of the substrates, two through holes (not illustrated) were formed by blast processing.

Next, an uncured material of the peripheral sealing seal 12 was prepared by kneading and mixing gap control particles (Sekisui Chemical Co., Ltd., Micro-pearl SP250 (diameter: 50 μm)) and a thermosetting epoxy resin mixture (Mitsui Chemicals, Structbond HC-1850). Next, the uncured material of the peripheral sealing seal 12 was applied onto the face of the electrode 11a or 11b by using a dispenser device. The application pattern at this time was drawn such that, after a process of attaching glasses described later, the two through holes provided in one of the glasses were arranged within a region surrounded by the peripheral sealing seal 12. Next, the substrate to which the uncured material of the peripheral sealing seal 12 was applied was heated to 90 degrees Celsius for 10 minutes to volatilize a solvent contained in the uncured material of the peripheral sealing seal 12. Next, after the substrate to which the uncured material of the peripheral sealing seal 12 was applied and the other substrate are attached so that the electrodes (11a, 11b) face each other, the uncured material of the sealing seal 12 was cured by exposing the substrates under the environment at 150 degrees Celsius for 2 hours.

A plurality of elements containing no EC solution were fabricated in such a way, some of which were cut along a plane perpendicular to the electrode face, and the electrode surface near the peripheral sealing seal 12 was observed by using a scanning electron microscope. FIG. 9B and FIG. 9C illustrate the results. As a result of observation, under the assumption that the electrode on the substrate side to which the peripheral sealing seal is applied is the cathode electrode and the other electrodes is the anode electrode, it was confirmed that $S_A$ was 159.48 (mm$^2$) and $S_C$ was 160.00 (mm$^2$). From this result, it was confirmed that the difference $S_C$-$S_A$ between $S_C$ and $S_A$ was 0.52 (mm$^2$). From the above discussion, it was confirmed that $S_A<S_C$ was satisfied (the electrode on the substrate side to which the peripheral sealing seal is applied has a larger area that is demarcated by the peripheral sealing seal). Furthermore, it was confirmed that the condition of $S_C<2S_A$ was satisfied.

Next, an anodic EC compound (dihydrophenazine derivative) and a cathodic EC compound (viologen derivative) were dissolved in propylene carbonate to have each concentration of 233 (mmol/L), and thereby an EC solution was prepared.

Next, under a nitrogen atmosphere, the EC solution was filled in a space demarcated by the facing electrodes (11a, 11b) and the peripheral sealing seal 12 via the through holes described above, and thereby the EC layer 13 was obtained. Next, an ultraviolet curable acrylic resin (ThreeBond Co., Ltd., TB3035B) was applied around the through holes, then shaped so as to close the holes, and cured by UV irradiation. Furthermore, an ultraviolet curable epoxy resin (Sekisui Chemical Co., Ltd., Photolec E-1220B) was applied to the same portion and cured by UV irradiation, and thereby the EC element 1 was obtained.

11. Evaluation of Color Unevenness

The EC element described above was arranged so that the element face was horizontal. Next, as illustrated in FIG. 10A, the imaging device 22 (Canon, Eos kiss ×5) was arranged above the element 1 such that the optical axis is orthogonal to the element face, and the flat lighting device 21 (FUJICOLOR HR-2) was arranged under the element 1. The EC element was driven by applying a voltage of 0.7 V between the anode and the cathode, images were acquired at intervals of 30 minutes for 24 hours immediately after the EC element started being driven. The acquired image was re-sized to 200 px×134 px. In the image, R values, B values, and G values of all the pixels included in the analysis region 25 described above were averaged, respectively, to acquire the reference RGB values. Furthermore, the analysis region 25 was divided into 256 rectangular regions of 16 in vertical and 16 in horizontal, and the color difference $\Delta E_{00}$ between the average RGB values of each region and the reference RGB values was calculated by using a color difference equation based on the definition of CIEDE2000. The maximum value of the color difference $\Delta E_{00}$ of each point obtained in such a way was determined as the absolute value of a color unevenness at each time, and evaluation was performed with the absolute value of a color unevenness in 24 hours.

12. Evaluation Result

First, for an EC element filled with an EC solution, after a voltage was applied so that the electrode on the substrate side applied with a peripheral sealing seal served as the anode ($S_A > S_C$) to have a colored state, the colored spectrum at the center of the element and the peripheral sealing seal nearest-part 13a was acquired. It was confirmed from the obtained spectrum shape that the anodic EC compound was colored preferentially in the peripheral sealing seal nearest-part 13a. Furthermore, the polarity of the voltage applied to the EC element was inverted and the colored spectral of the peripheral sealing seal nearest-part 13a was again confirmed, and then a preferential coloring of the anodic EC compound was confirmed as with before the inversion. It was confirmed from the above result that the peripheral sealing seal of the example was an anodic reaction-preferential peripheral sealing seal.

Figure 13:
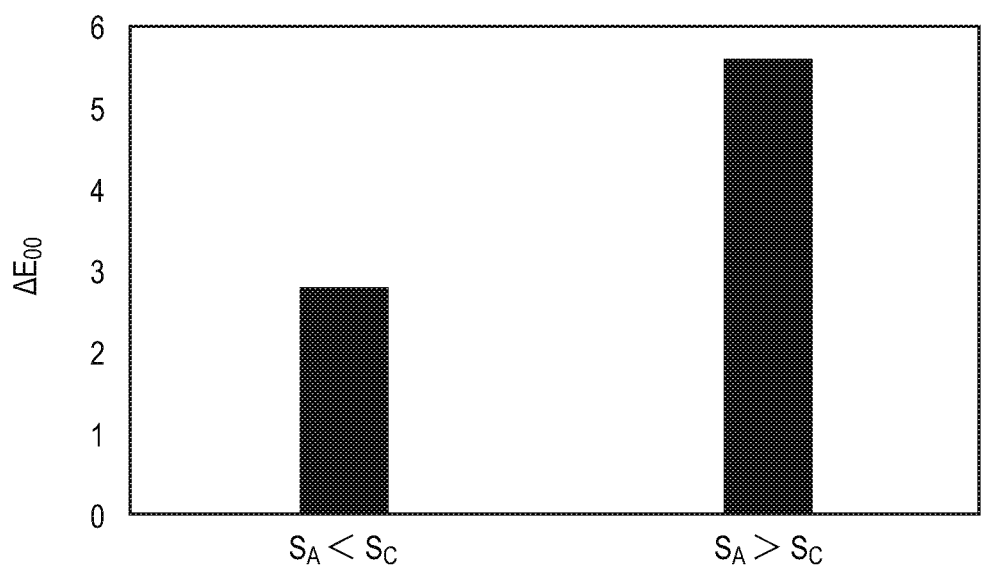
FIG. 13 is a diagram illustrating a relationship between the relationship between an area $S_A$ and an area $S_C$ demarcated by the peripheral sealing seal and a degree of unevenness.

FIG. 13 is a graph illustrating a result when the color unevenness index $\Delta E_{00}$ is measured for two conditions of a case where the electrode on the substrate side applied with a peripheral sealing seal is the cathode electrode ($S_A < S_C$) and a case where the electrode is the anode electrode ($S_A > S_C$). It was confirmed from FIG. 13 that the color difference in the case of $S_A < S_C$ was smaller by around 2.8 than that in the case of $S_A > S_C$, and the condition of $\Delta E_{00} \le 3.2$ described above was satisfied.

According to the above example, the following advantage was confirmed.

(A) In a complementary EC element that is an EC element in which the peripheral sealing seal 12 is an anodic reaction-preferential peripheral sealing seal, when $S_A < S_C$ is satisfied, a color unevenness due to the peripheral sealing seal 12 can be highly reduced.

(B) An EC element that satisfies $S_A < S_C$ can highly reduce a color unevenness due to the peripheral sealing seal 12 even when the concentration of an EC compound is higher than 0.1 mol/L.

Note that the same advantage can be confirmed also in an EC element in which the peripheral sealing seal 12 is a cathodic reaction-preferential peripheral sealing seal.

According to the present disclosure, it is possible to provide an EC element in which color unevenness due to a peripheral sealing seal is reduced.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-244338, filed Dec. 27, 2018, and No. 2019-144645, filed Aug. 6, 2019, which are hereby incorporated by reference herein in their entirety.

What is claimed is:

1. An electrochromic element comprising:
   a first electrode;
   a second electrode;
   a peripheral sealing seal arranged between the first electrode and the second electrode; and
   an electrochromic layer arranged in a space demarcated by the first electrode, the second electrode, and the peripheral sealing seal,
   wherein one of the first electrode and the second electrode is an anode electrode, and the other is a cathode electrode,
   wherein the electrochromic layer is an electrochromic element having an anodic electrochromic compound and a cathodic electrochromic compound,
   wherein the peripheral sealing seal is an anodic reaction-preferential peripheral sealing seal in which an oxidation reaction of the anodic electrochromic compound preferentially occurs near the peripheral sealing seal, and
   wherein $S_A < S_C$, where $S_A$ is an area demarcated by the peripheral sealing seal of the anode electrode, and $S_C$ is an area demarcated by the peripheral sealing seal of the cathode electrode.

2. The electrochromic element according to claim 1, wherein $S_C < 2S_A$.

3. The electrochromic element according to claim 2, wherein $S_C - S_A \ge 200$ (µm)×$L_C$, where $L_C$ (µm) is a length of a boundary of the peripheral sealing seal on the cathode electrode.

4. The electrochromic element according to claim 1, wherein a sum of a concentration of the anodic electrochromic compound and a concentration of the cathodic electrochromic compound in the electrochromic layer is greater than or equal to 0.1 mol/L.

5. The electrochromic element according to claim 4, wherein a sum of a concentration of the anodic electrochromic compound and a concentration of the cathodic electrochromic compound in the electrochromic layer is greater than or equal to 0.1 mol/L.

6. A lens unit comprising:
   the optical filter according to claim 5; and
   an imaging optical system having a plurality of lenses.

7. An imaging device comprising:
   the optical filter according to claim 5; and
   a light receiving element that receives a light that has passed through the optical filter.

8. The electrochromic element according to claim 4, wherein the electrochromic layer has a solvent.

9. An optical filter comprising:
   the electrochromic element according to claim 4; and an active element connected to the electrochromic element and configured to drive the electrochromic element.

10. A lens unit comprising:
the optical filter according to claim 9; and
an imaging optical system having a plurality of lenses.

11. An imaging device comprising:
the optical filter according to claim 9; and
a light receiving element that receives a light that has passed through the optical filter.

12. A window member comprising:
the electrochromic element according to claim 4; and
an active element connected to the electrochromic element.

13. The electrochromic element according to claim 1, wherein a sum of a concentration of the anodic electrochromic compound and a concentration of the cathodic electrochromic compound in the electrochromic layer is greater than or equal to 0.4 mol/L.

14. The electrochromic element according to claim 1, wherein the electrochromic layer has a solvent.

15. The electrochromic element according to claim 1, wherein each of the anodic electrochromic compound and the cathodic electrochromic compound is an organic compound.

16. An optical filter comprising:
the electrochromic element according to claim 1; and
an active element connected to the electrochromic element and configured to drive the electrochromic element.

17. A window member comprising:
the electrochromic element according to claim 1; and
an active element connected to the electrochromic element.

18. An electrochromic element comprising:
a first electrode;
a second electrode;
a peripheral sealing seal arranged between the first electrode and the second electrode; and
an electrochromic layer arranged in a space demarcated by the first electrode, the second electrode, and the peripheral sealing seal,
wherein one of the first electrode and the second electrode is an anode electrode, and the other is a cathode electrode,
wherein the electrochromic layer is an electrochromic element having an anodic electrochromic compound and a cathodic electrochromic compound,
wherein the peripheral sealing seal is a cathodic reaction-preferential peripheral sealing seal in which a reduction reaction of the cathodic electrochromic compound preferentially occurs near the peripheral sealing seal, and
wherein $S_C < S_A$, where $S_A$ is an area demarcated by the peripheral sealing seal of the anode electrode, and $S_C$ is an area demarcated by the peripheral sealing seal of the cathode electrode.

19. The electrochromic element according to claim 18, wherein $S_A < 2S_C$.

20. The electrochromic element according to claim 19, wherein $S_A - S_C \geq 200$ (µm)×$L_A$, where $L_A$ (µm) is a length of a boundary of the peripheral sealing seal on the anode electrode.

* * * * *